United States Patent
Sandford et al.

(10) Patent No.: US 10,935,670 B2
(45) Date of Patent: Mar. 2, 2021

(54) NAVIGATION SYSTEM FOR GPS DENIED ENVIRONMENTS

(71) Applicants: Stephen Parker Sandford, Yorktown, VA (US); Diego Fernando Pierrottet, Poquoson, VA (US)

(72) Inventors: Stephen Parker Sandford, Yorktown, VA (US); Diego Fernando Pierrottet, Poquoson, VA (US)

(73) Assignee: Psionic, LLC, Hampton, VA (US)

(*) Notice: Subject to any disclaimer, the term of this patent is extended or adjusted under 35 U.S.C. 154(b) by 404 days.

(21) Appl. No.: 15/932,639

(22) Filed: Mar. 28, 2018

(65) Prior Publication Data

US 2019/0302276 A1  Oct. 3, 2019

(51) Int. Cl.
*G01S 19/48* (2010.01)
*G01S 17/58* (2006.01)
(Continued)

(52) U.S. Cl.
CPC ............ *G01S 19/48* (2013.01); *G01C 21/025* (2013.01); *G01C 21/12* (2013.01); *G01C 21/20* (2013.01);
(Continued)

(58) Field of Classification Search
CPC .. G01C 21/28; G01C 21/165; G01C 21/3602; G06K 19/06046; G06K 7/10871; G06K 19/06131; G06K 7/1421; G06K 19/06037; G06K 19/06168; G06K 7/10722; G05D 1/0234; G05D 1/0094; G05D 1/042; B64C 39/024
See application file for complete search history.

(56) References Cited

U.S. PATENT DOCUMENTS

| | | |
|---|---|---|
| 8,111,943 B2 | 2/2012 | Jobson |
| 8,494,687 B2 | 7/2013 | Vanek |

(Continued)

FOREIGN PATENT DOCUMENTS

| | | |
|---|---|---|
| EP | 1 555 545 A1 | 7/2005 |
| WO | WO 2018 102 188 | 6/2018 |

(Continued)

OTHER PUBLICATIONS

Arbabian, Amin et. al., A 94 GHz mm Wave to Baseband Pulsed Radar Transceiver With Applications in Imaging and Gesture Recognition, IEEE Journal of Solid State Circuits, Apr. 2013,1055-1071, vol. 48, IEEE, USA (Continued)

*Primary Examiner* — Luke D Ratcliffe
(74) *Attorney, Agent, or Firm* — Thomas Nello Giaccherini

(57) ABSTRACT

Methods and apparatus for providing self-contained guidance, navigation, and control (GN&C) functions for a vehicle moving through an environment on or near the ground, in the air or in space without externally provided information are disclosed. More particularly, one embodiment of the present invention includes a Heading Sensor (36), an Absolute Location Sensor (38), a timer (40), a Range Doppler Processor (42), a Navigation Reference Sensor (44), an Area Range and a Velocity Sensor (46) which provide enhanced navigation information about a universal reference frame (22) and one or more targets (20).

3 Claims, 19 Drawing Sheets

(51) Int. Cl.

| | |
|---|---|
| G01S 1/24 | (2006.01) |
| G01S 15/58 | (2006.01) |
| G01C 21/02 | (2006.01) |
| G01C 21/12 | (2006.01) |
| G01S 17/93 | (2020.01) |
| G01C 21/20 | (2006.01) |
| G01S 15/86 | (2020.01) |
| G01S 17/34 | (2020.01) |
| G01S 17/86 | (2020.01) |
| G01C 21/16 | (2006.01) |

(52) U.S. Cl.
CPC ............... *G01S 1/24* (2013.01); *G01S 15/58* (2013.01); *G01S 15/86* (2020.01); *G01S 17/34* (2020.01); *G01S 17/58* (2013.01); *G01S 17/86* (2020.01); *G01S 17/93* (2013.01); *G01C 21/165* (2013.01)

(56) References Cited

U.S. PATENT DOCUMENTS

| | | | |
|---|---|---|---|
| 8,508,722 | B2 | 9/2013 | Rogers |
| 8,655,513 | B2 | 2/2014 | Vanek |
| 8,897,654 | B1 | 11/2014 | Pierrottet |
| 9,007,569 | B2 | 4/2015 | Amzajerdian |
| 9,804,264 | B2 | 10/2017 | Villeneuve |
| 2008/0239279 | A1 | 10/2008 | Krishnaswamy |
| 2014/0036252 | A1 | 2/2014 | Amzajerian |
| 2015/0268058 | A1* | 9/2015 | Samarasekera ...... G08G 5/0073 701/409 |
| 2017/0116867 | A1 | 4/2017 | Cherepinsky |
| 2018/0259341 | A1* | 9/2018 | Aboutalib ............... G06T 7/579 |
| 2019/0138029 | A1* | 5/2019 | Ryll ........................ G05D 1/101 |
| 2019/0339718 | A1* | 11/2019 | Koch ..................... B64C 39/024 |
| 2020/0012829 | A1* | 1/2020 | Davidson ............... G01C 21/28 |

FOREIGN PATENT DOCUMENTS

| | | |
|---|---|---|
| WO | WO 2018 102 190 | 6/2018 |
| WO | WO 2018 125 438 | 7/2018 |

OTHER PUBLICATIONS

Amzajerdian Farzin et. al., Advancing Lidar Sensors Technologies for Next Landing Missions, AIAA Guidance, Navigation, and Control Conference, Jan. 5-9, 2015, AIAA, Reston, VA, USA.

Paul J. M. Suni et. al., Photonic Integrated Circuts for Coherent Lidar, 18th Coherent Laser Radar Conference Proceedings, Jun. 27-Jul. 1, 2016, 132-137, Cooperative Institute for Research in Environmental Sciences, Boulder, CO, USA.

No Author Information Available, CMA-2012 Doppler Velocity Sensor and Navigation Sensor, Navigation Sensors and Systems Product Brochure, Oct. 2012, 1-2, Esterline CMC Electronics, Quebec, Canada.

Simpson, Marc L. et. al., Application of Coherent 10 Micron Immaging Lidar, Proceedings, 9th Conference on Coherent Laser Radar, Jun. 23-27, 1997, Linkoping, Sweden.

No Author Information Available, LeddarVu Compact Fixed-Beam Lidar Sensor Module, Product DataSheet, 2016, 2-4, Leddar Tech, Quebec City, Canada.

Carson III, John M. et. al., Open-Loop Flight Testing of COBALT Navigation and Sensor Technologies for Precise Soft Landing, AIAA Space and Astronautics Forum and Exposition, Oct. 2017, AIAA, Reston, VA, USA.

Hurley, Bill, NASA Navigation Sensor may Land in Applications Beyond Mars, NASA Tech Briefs, Mar. 1, 2017, Tech Briefs Media Group, New York, NY USA.

No Author Information Available , OPAL Performance Series 3D LIDAR, 2017, 1-2, Neptec Technologies Corp., AutonomouStuff, Morton, IL, USA.

Amzajerdian, Farzin et. al., Fiber-based Doppler Lidar for Vector Velocity and Altitude Measurements, Frontiers in Optics/Laser Science, 2015, paper LTu3l.2., OSA Technical Digest (Online), Optical Society of America, San Jose, CA, USA.

Gabell, Andy et. al., The GT-1A Mobile Gravimeter, Airborne Gravity 2004 Workshop Record, 2004, 55-62, Australian Government Geosciences, Sydney, Australia.

Simons, Richard, Autonomous Vehicles Open Up New Roads for LIDAR Growth, Tech Briefs Photonics & Imaging Technologies, May 1, 2017, Tech Briefs Media Group, New York, NY, USA.

No Author Information Available, Puck Lite, velodynelidar.com, 2017, 1-2, Velodyne Lidar, Inc. San Jose, CA USA.

Jirong Yu et. al., Advanced 2-um solid-state Laser for Wind and CO2 Lidar Applications, Nov. 2006, 1-12, NASA Technical Reports Server Langley, Hampton, VA USA.

No Author Information Available, Should Your Next Car Have a Crash Prevention System, Cartelligent Blog, Oct. 21, 2018, 1-8, Cartelligent, San Francisco, CA USA.

Iozzio, Corinne, 4 Driverless Car Features Going Standard, Scientific American Online, Apr. 1, 2015, 2-4, Scientific American, New York, NY USA.

Knight, Renee, The Future of Autonomy, Inside Unmanned Systems, Mar. 2, 2015, 1-6, Autonomous Media, LLC, Washington DC USA.

Sedgwick, David, Demand Skyrockets for Collision-Avoidance Sensors, Automotive News Tech Blog, Oct. 13, 2014, 2-5, Crain Communications, Detroit, MI USA .

Evans, Martin, et.al., Traffic Collision Avoidance System, Wikipedia, Dec. 19, 2018, Wikipedia The Free Encyclopedia, published on World Wide Web at addess:https://en.wikipedia.org/w/index.php?title=Collision_avoidance_system&oldid=878038162 .

Boerlu, Horatiu, BMW Showcasing 360-Degree Collision Avoidance, Jan. 6, 2015, www.bmwblog.com/2015/01/06/bmw-showcasing-360-degree-collision-avoidance.

Author: Amzajerdian, Farzin Title of Paper: Imaging flash lidar for safe landing on solar system bodies and spacecraft rendezvous and docking Publication & Date: Laser Radar Technology and Applications XX and Atmospheic Propagation XII, 2015, Proceedings of SPIE vol. 9465 pp. 946502-1 to 946502-13 vol. 946502 Publisher: Soceity of Photographic Instrumentation Engineers (SPIE) Country of Publication: USA.

* cited by examiner

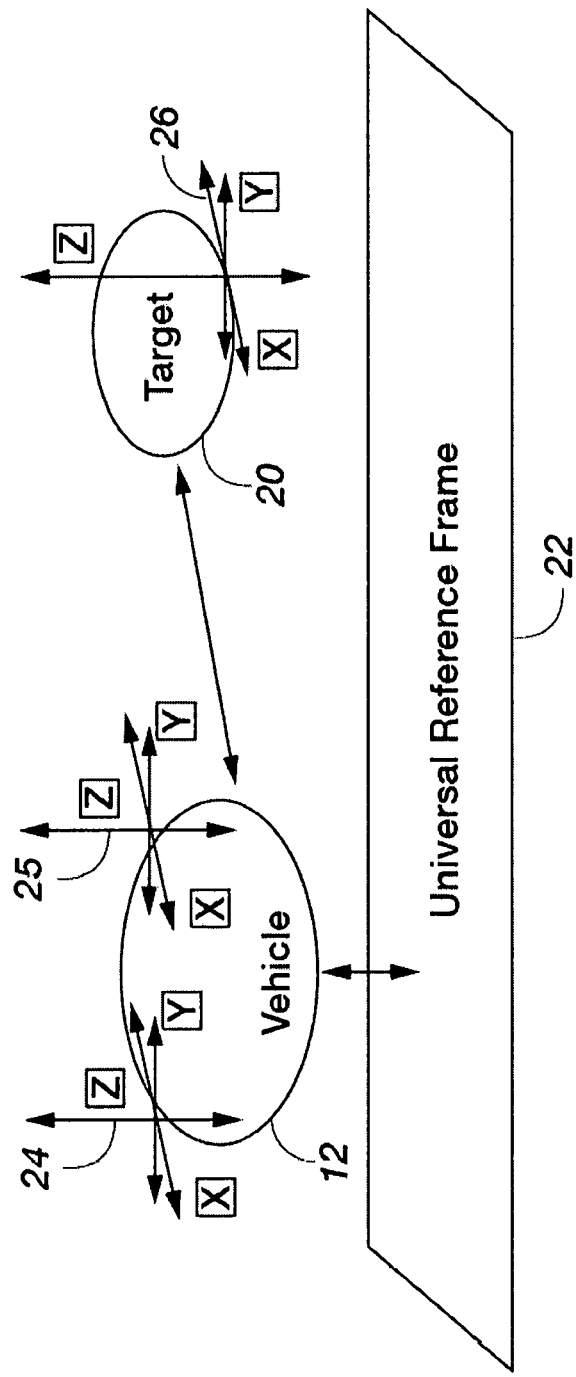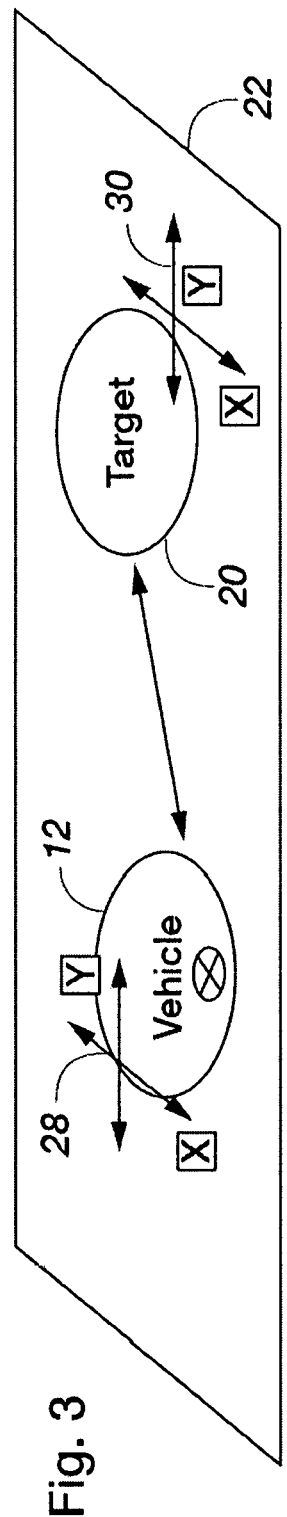
Fig. 2
Fig. 3

NAVIGATION SYSTEM FOR GPS DENIED ENVIRONMENTS

FIELD OF THE INVENTION

One embodiment of the present invention relates to methods and apparatus for obtaining position, orientation, location, altitude, velocity, acceleration or other geodetic, calibration or measurement information in GPS denied environments. More particularly, one embodiment of the invention pertains to the illumination of one or more targets or other objects with LIDAR emissions, receiving one or more reflections from targets or other objects using customized sensors, and then processing the reflections with purposefully designed software to produce information that is presented on a visual display for a user or used by an autonomous controller.

CROSS-REFERENCE TO A RELATED PENDING PATENT APPLICATION & CLAIM FOR PRIORITY

None.

FEDERALLY SPONSORED RESEARCH OR DEVELOPMENT

None.

BACKGROUND OF THE INVENTION

Navigation is a process that ideally begins with an absolute knowledge of one's location. The goal is to reach a destination located somewhere else. Once movement begins it becomes critical to know how fast one is moving (v=speed), in what direction (heading), and how long (t=time elapsed) one moves at that speed in that direction. If these are known without error then the equation vt=x gives the current location at time t. Errors in speed, timing or direction will introduce uncertainty in the new location.

For aerial vehicles there are three angles of orientation (pitch, roll, and yaw) and three position coordinates (x, y, and height above the ground) that can change with time. These six degrees of freedom (6-DOF) means there are six variables that need to be measured in order to know where one is at any particular time. For ground vehicles that travel in the plane of a surface then there are only two position coordinates (x and y) and one angle (yaw) that need to be measured to know where one is at any particular time. This is a 3 degree of freedom (3-DOF) problem. The same general principles of navigation apply and low-error measurements of speed relative to the ground provides a powerful new navigation capability.

The Global Positioning System (GPS) comprises a set of satellites in orbit which transmit signals toward the surface of the Earth. A person on the ground may use a signal received by a GPS radio to determine his or her location or altitude.

According to Wikipedia:

"The Global Positioning System (GPS), originally Navstar GPS, is a space-based radionavigation system owned by the United States government and operated by the United States Air Force."

"It is a global navigation satellite system that provides geolocation and time information to a GPS receiver anywhere on or near the Earth where there is an unobstructed line of sight to four or more GPS satellites."

"The GPS does not require the user to transmit any data, and it operates independently of any telephonic or internet reception, though these technologies can enhance the usefulness of the GPS positioning information. The GPS provides critical positioning capabilities to military, civil, and commercial users around the world. The United States government created the system, maintains it, and makes it freely accessible to anyone with a GPS receiver."

"The GPS project was launched by the U.S. Department of Defense in 1973 for use by the United States military and became fully operational in 1995. It was allowed for civilian use in the 1980s."

In some situations and conditions, the GPS is unavailable. A location, area or region which does not offer location service via the GPS is called a "GPS denied environment." This environment or condition can occur or be caused by geographical or topological constraints, or by the deliberate action of persons who seek to disable the GPS service. For example, an enemy on a battlefield may seek to jam or to interfere with the GPS service to deny its use to an adversary.

In this situation, a person, a vehicle or some other user needs some other apparatus and/or hardware to accurately determine location and/or altitude without the benefit of GPS.

The development of a system that enables a user or an automated controller to determine position, orientation, location, altitude, velocity, acceleration or other geodetic, calibration or measurement information would be a major technological advance, and would satisfy long-felt needs in the satellite and telecommunications industries.

SUMMARY OF THE INVENTION

One embodiment of the present invention includes methods and apparatus for providing self-contained guidance, navigation, and control (GN&C) functions for a vehicle moving through an environment on the ground, in the air or in space without externally provided information. The system provides situational awareness information suitable for artificial intelligence decision making, and avoidance of stationary or mobile hazards and hazard-relative navigation. One embodiment of the present invention is specifically designed to supply navigation information in a GPS denied environment. Alternative embodiments use the hardware and software described in the Detailed Description to provide enhanced navigation information to a wide variety of vehicles. The present invention may configured to supply navigation information when combined with control systems aboard commercial or civilian aircraft, including passenger and cargo planes, UAVs and drones; as well on as cars and trucks on conventional roads and highways.

The present invention detects vehicle velocity vector and range with respect to a reference point, plane or object, and vehicle relative velocity and range to and of other vehicles and/or objects in its environment to provide vehicle state data required for navigation and situational awareness for guidance and control functions. Combining sensor information from these two velocity sensors and range sensors and other onboard sensors offers capability not possible with current onboard systems. Navigation without GPS signals and without significant systematic errors offers new capability for GPS denied vehicles.

The present invention can largely eliminate the systematic error due to the linear accelerometers used for navigation. By combining a good clock, a heading sensor like a compass, a gyroscope, and/or a terrain matching system with Doppler LIDAR (Light, Detection and Ranging) the present invention allows stealthy, self-reliant, accurate navigation over long distances which is not economically possible with current technology.

Knowledge of initial location, as well as heading and elapsed time, may be obtained by a number of methods. The present invention offers highly accurate speed measurements that do not degrade over time due to accumulated error. This comes about because the present invention, unlike previous systems, measures speed directly rather than position measurements that are differentiated or acceleration measurements that are integrated to obtain velocity.

The present invention enables accurate, long-term navigation, and sense and avoid decisions using only information obtained from onboard sensors. By combining sensors operating in different modes, critical navigational state parameters are measured continuously without significant systematic errors that allows a vehicle whose initial state is known to execute guidance, navigation, and control (GN&C) functions to reach its desired destination safely.

An appreciation of the other aims and objectives of the present invention, and a more complete and comprehensive understanding of this invention, may be obtained by studying the following description of a preferred embodiment, and by referring to the accompanying drawings.

A BRIEF DESCRIPTION OF THE DRAWINGS

FIGS. 2 & 3 are schematic illustrations of generalized sensor system reference frames, including a universal reference frame, a vehicle reference frame, and a target reference frame.

Figure 4:
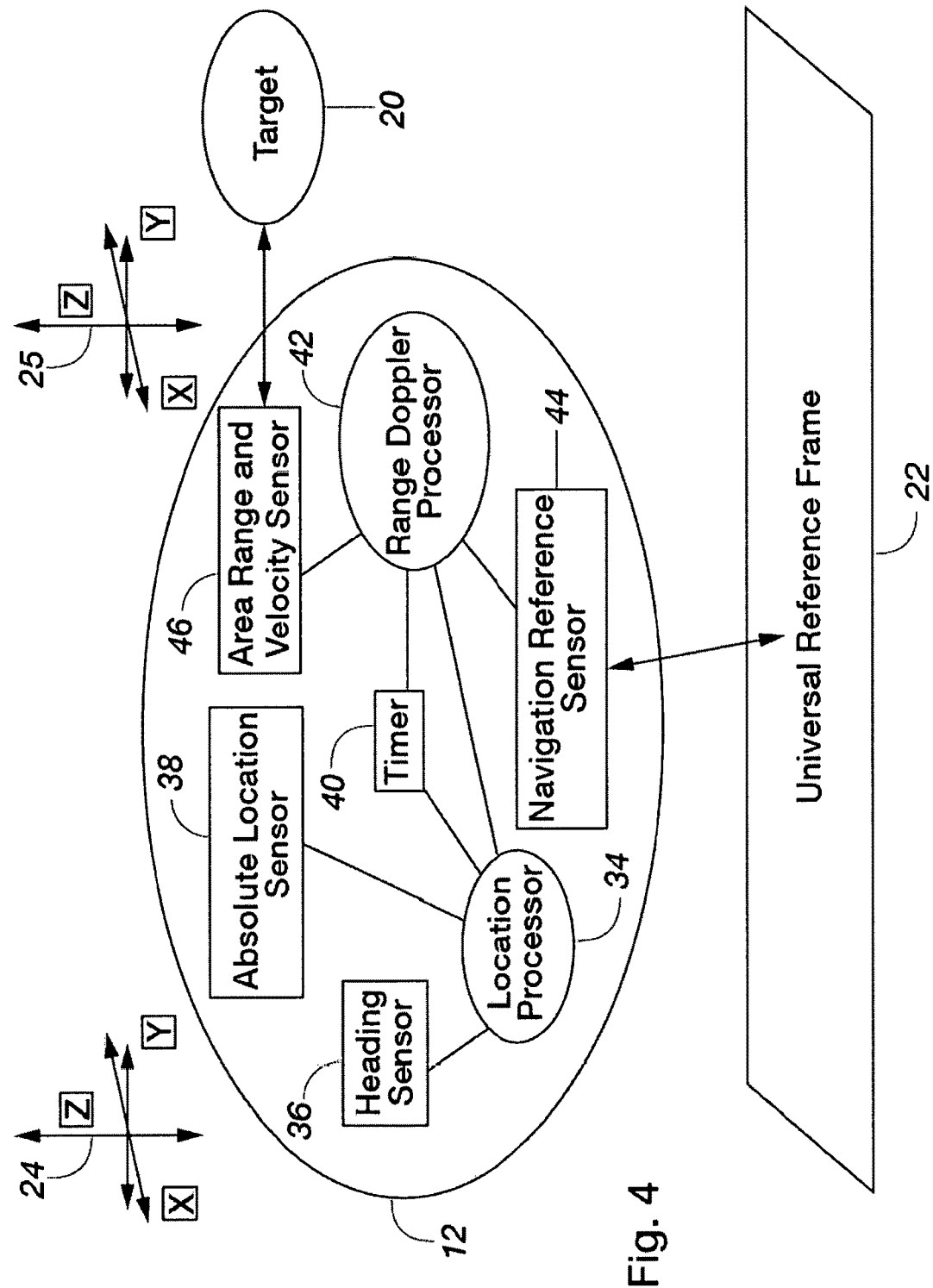

FIG. 4 presents a schematic view of the elements of one embodiment of the present invention.

Figure 5:
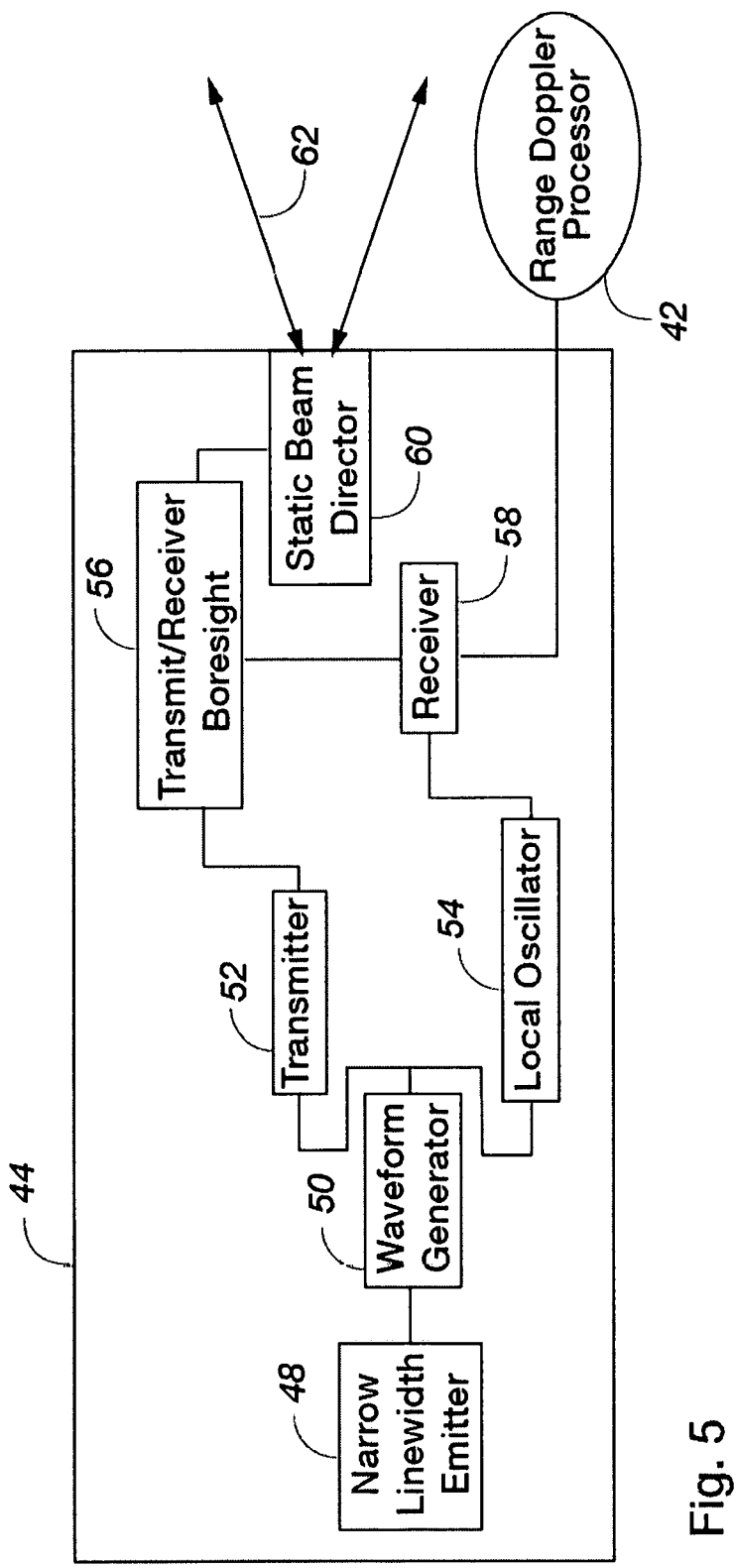

FIG. 5 is a schematic block diagram of one embodiment of a Navigation Reference Sensor.

Figure 6:
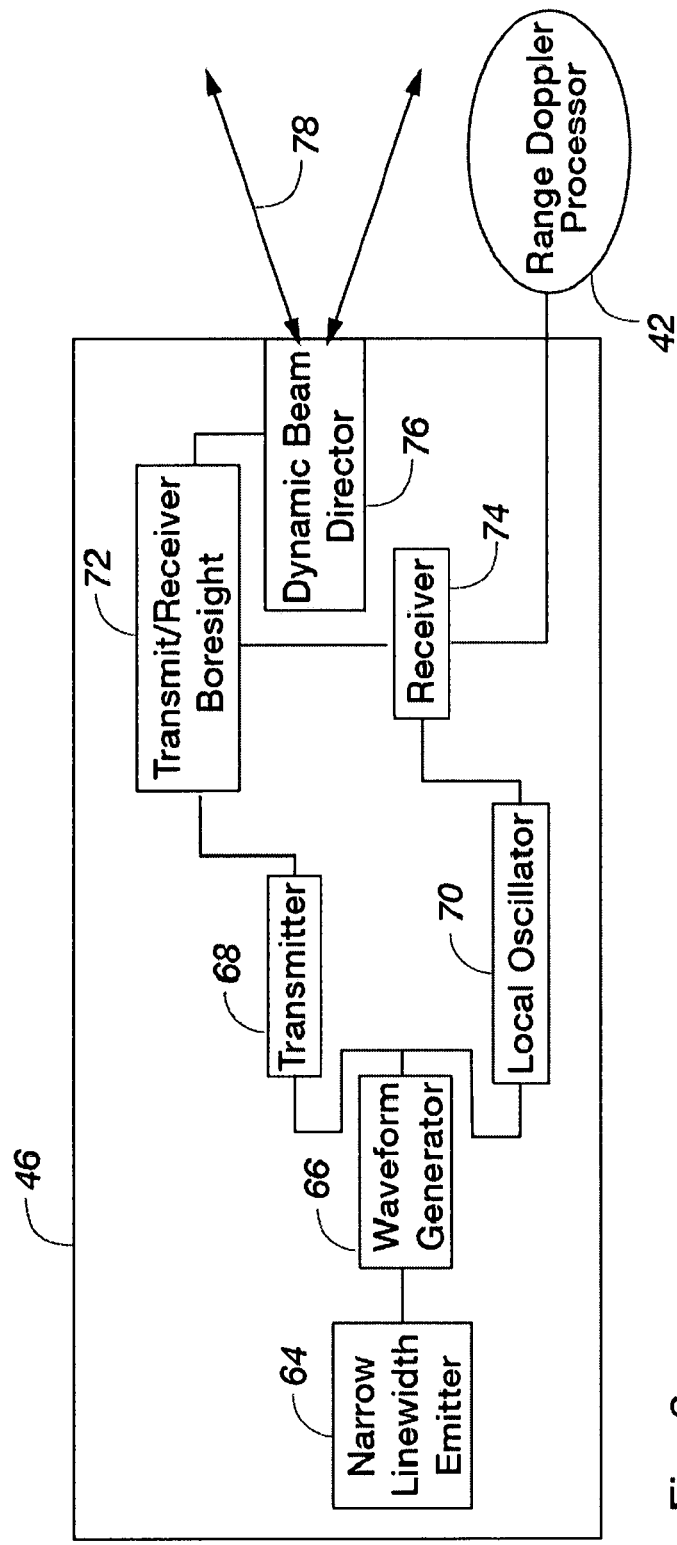

FIG. 6 is a schematic block diagram of one embodiment of an Area Range & Velocity Sensor.

Figure 7:
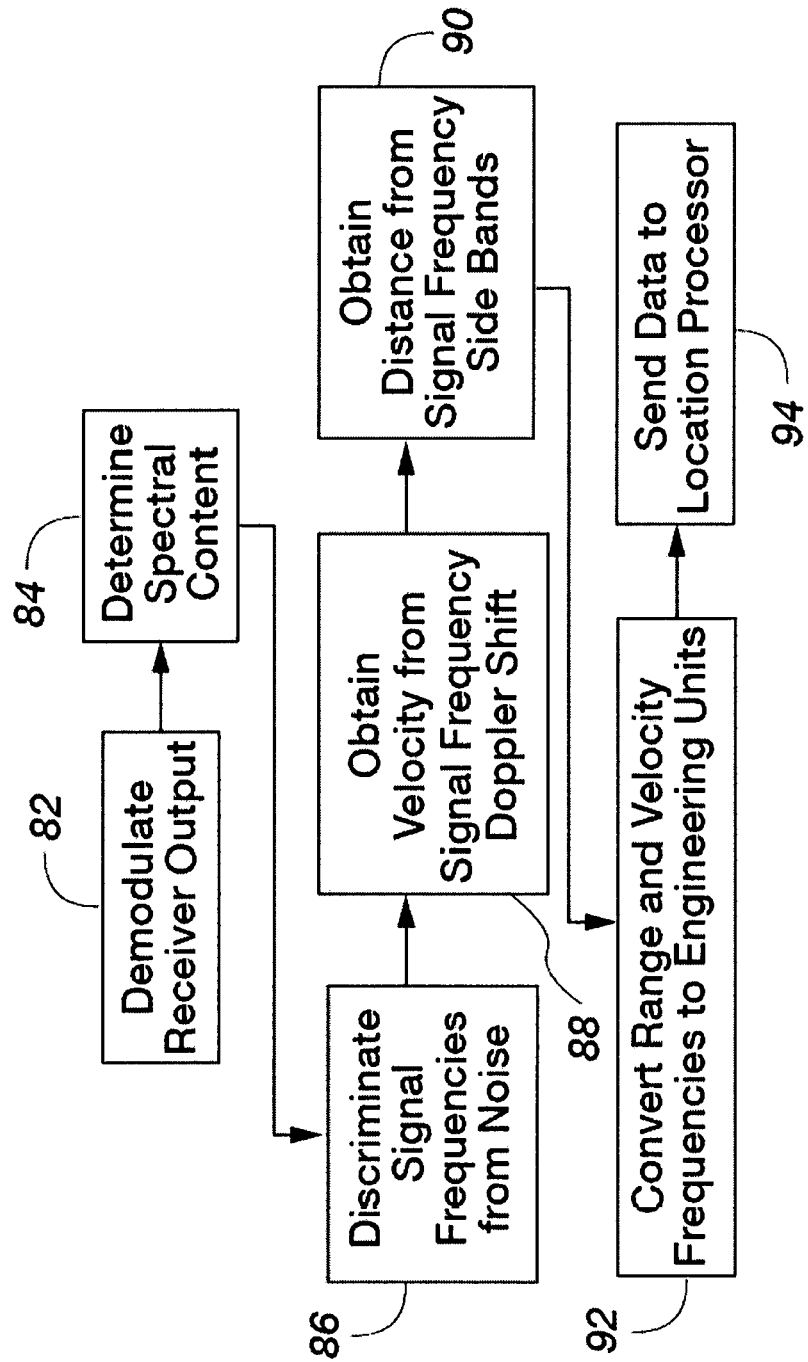

FIG. 7 is a schematic block diagram of one embodiment of a Range Doppler Processor.

Figure 8:
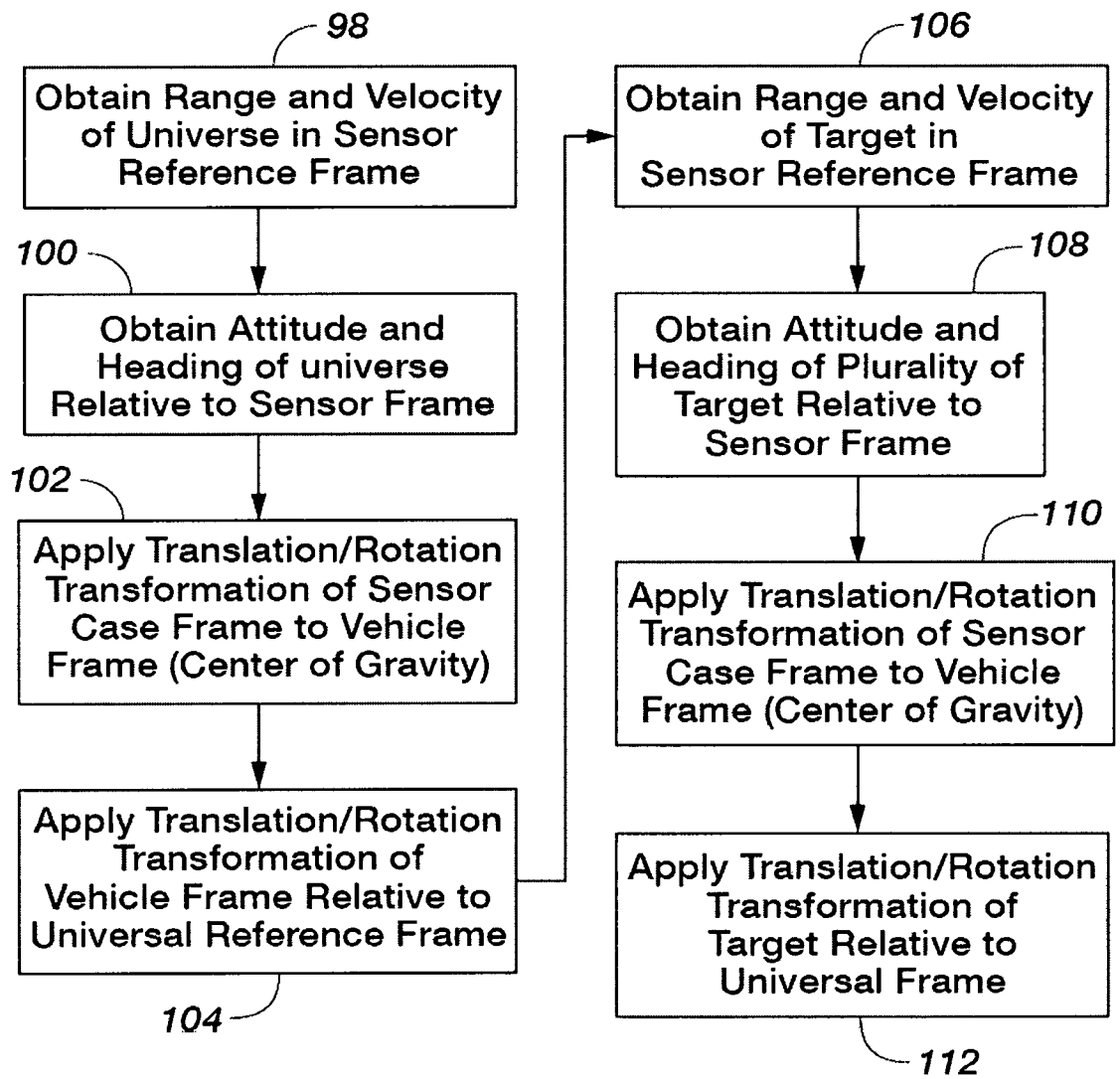

FIG. 8 is a flow chart that reveals the method steps that are implemented in one embodiment of a Location Processor.

Figures 9, 10:
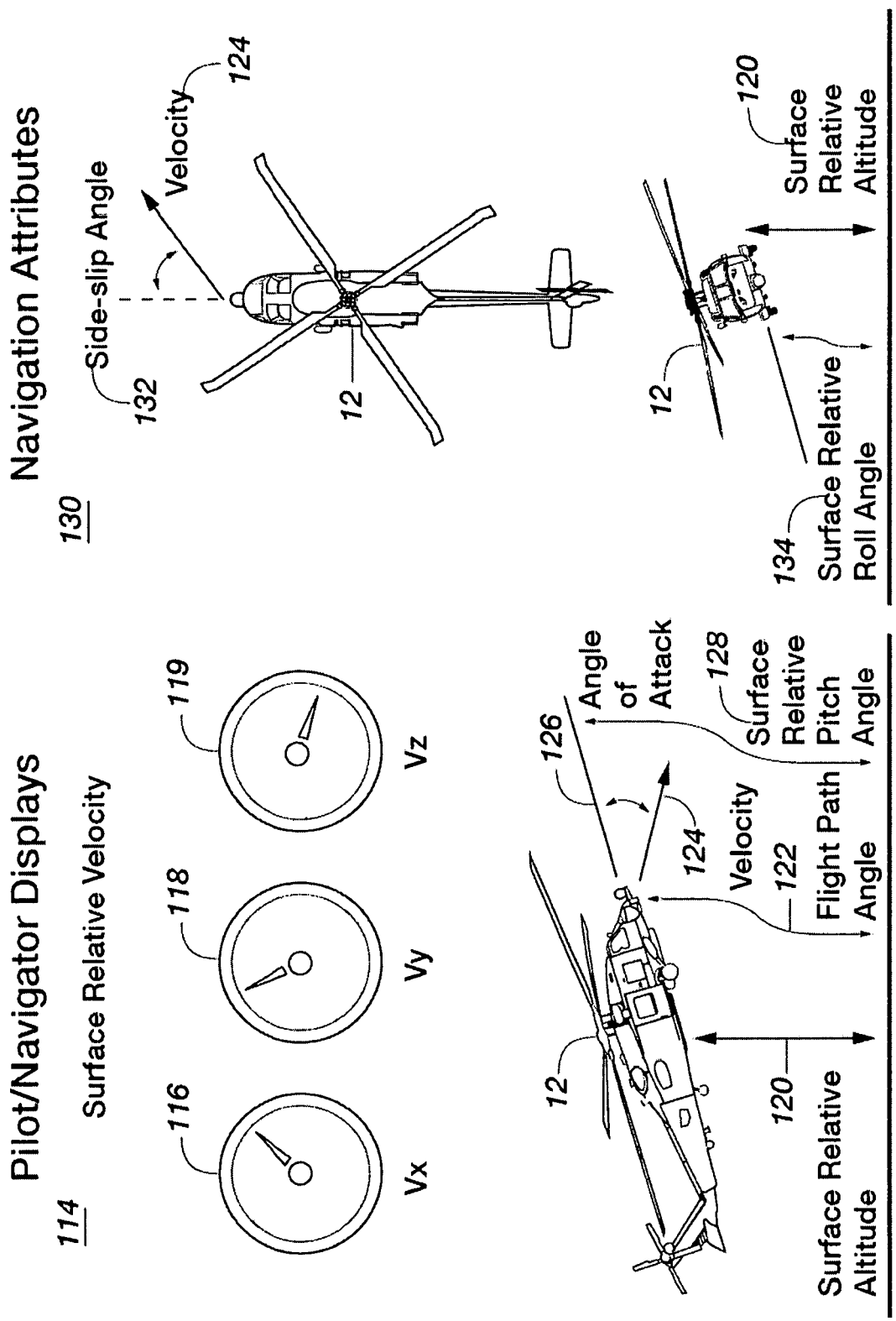

FIG. 9 portrays instruments in a helicopter that supply navigation information.

FIG. 10 depicts navigation attributes that are employed in one embodiment of the present invention.

Figure 11:
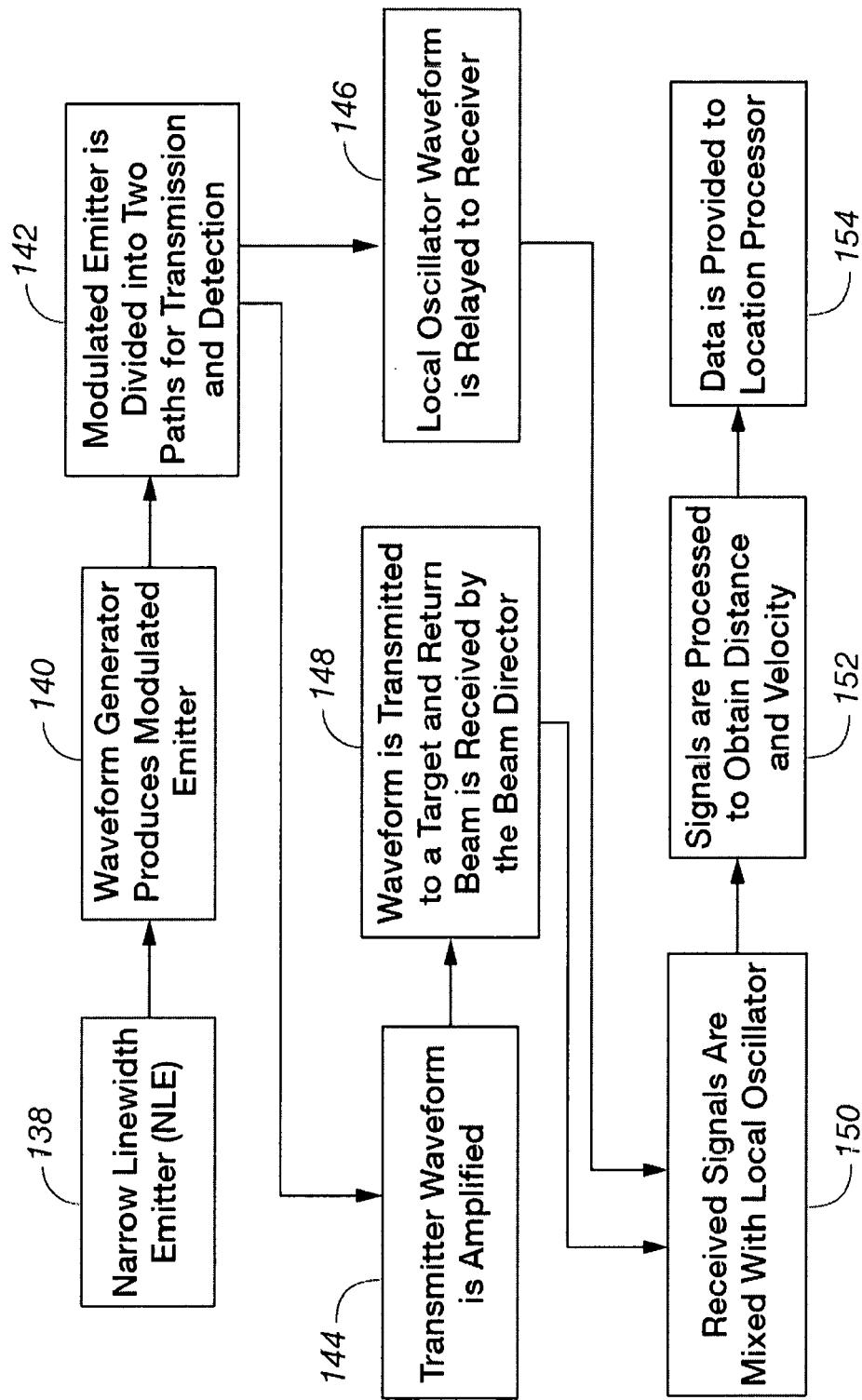

FIG. 11 furnishes a flow chart of method steps pertaining to Coherent LIDAR Operation which are implemented in one embodiment of the present invention.

Figure 12:
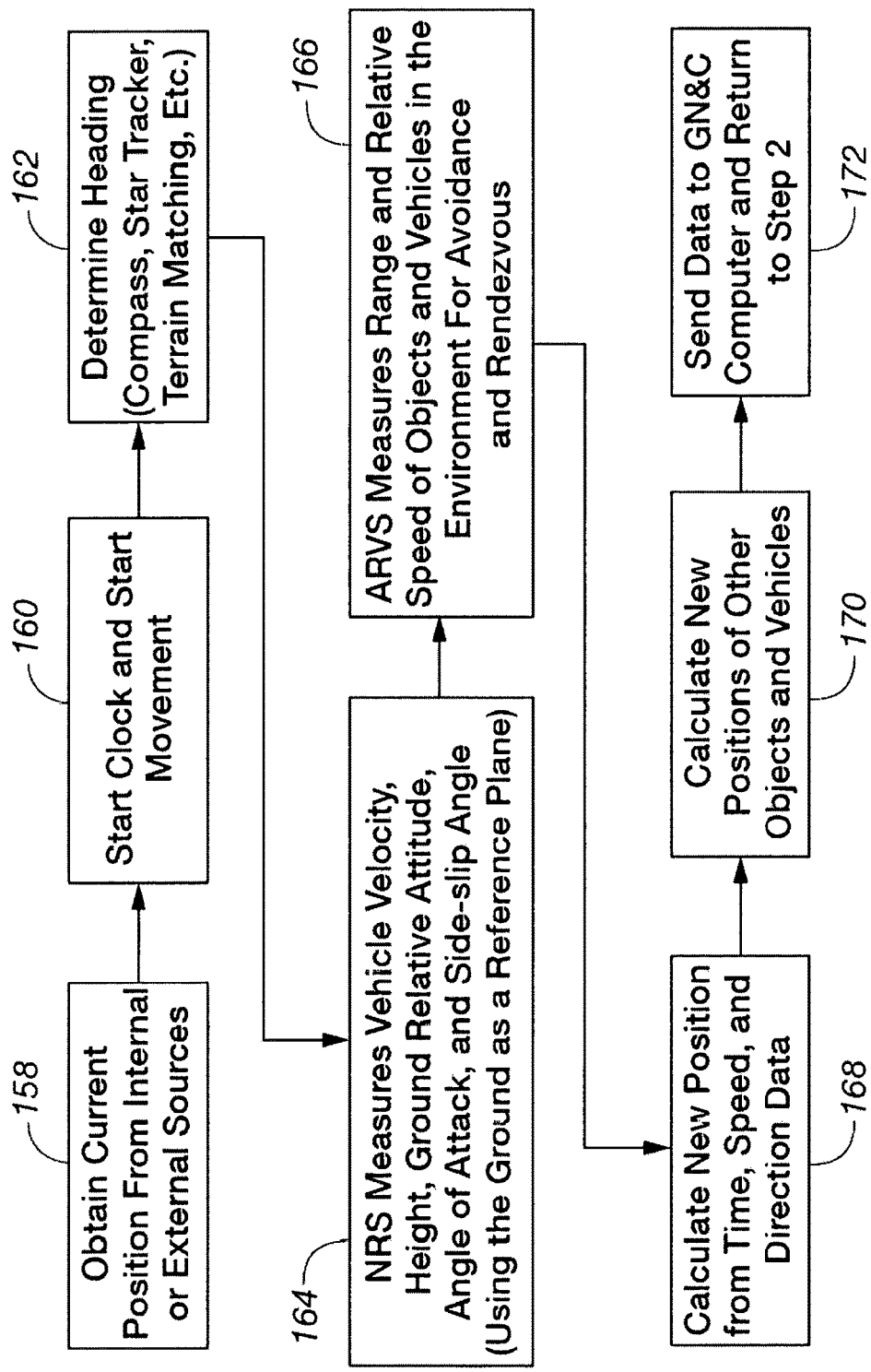

FIG. 12 provides a flow chart of method steps pertaining to an algorithm for determining the location of a vehicle which are implemented in one embodiment of the present invention.

Figure 13:
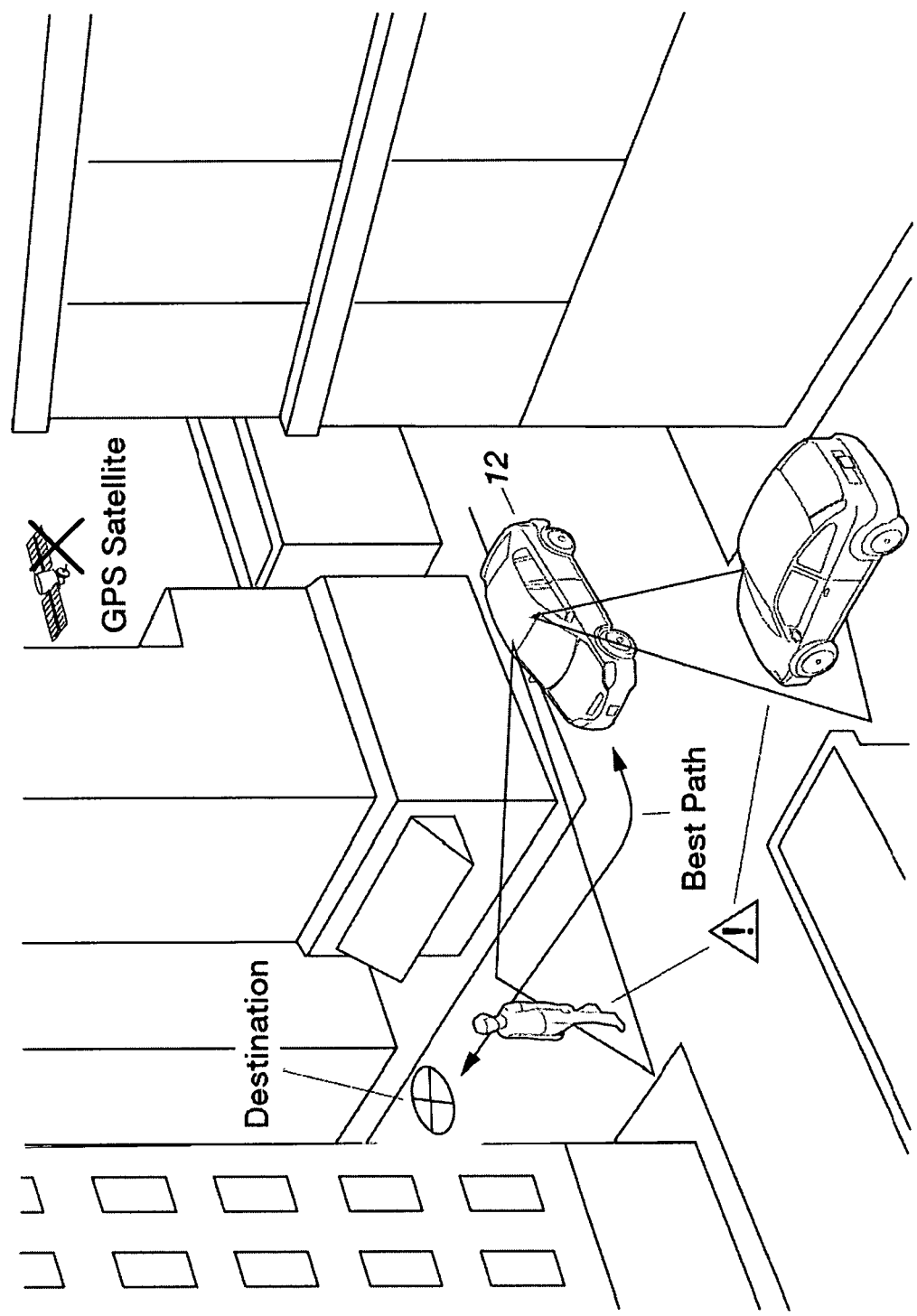

FIG. 13 offers a schematic view of a ground vehicle which utilizes an alternative embodiment of the invention to find an optimized path that avoids an accident.

Figure 14:
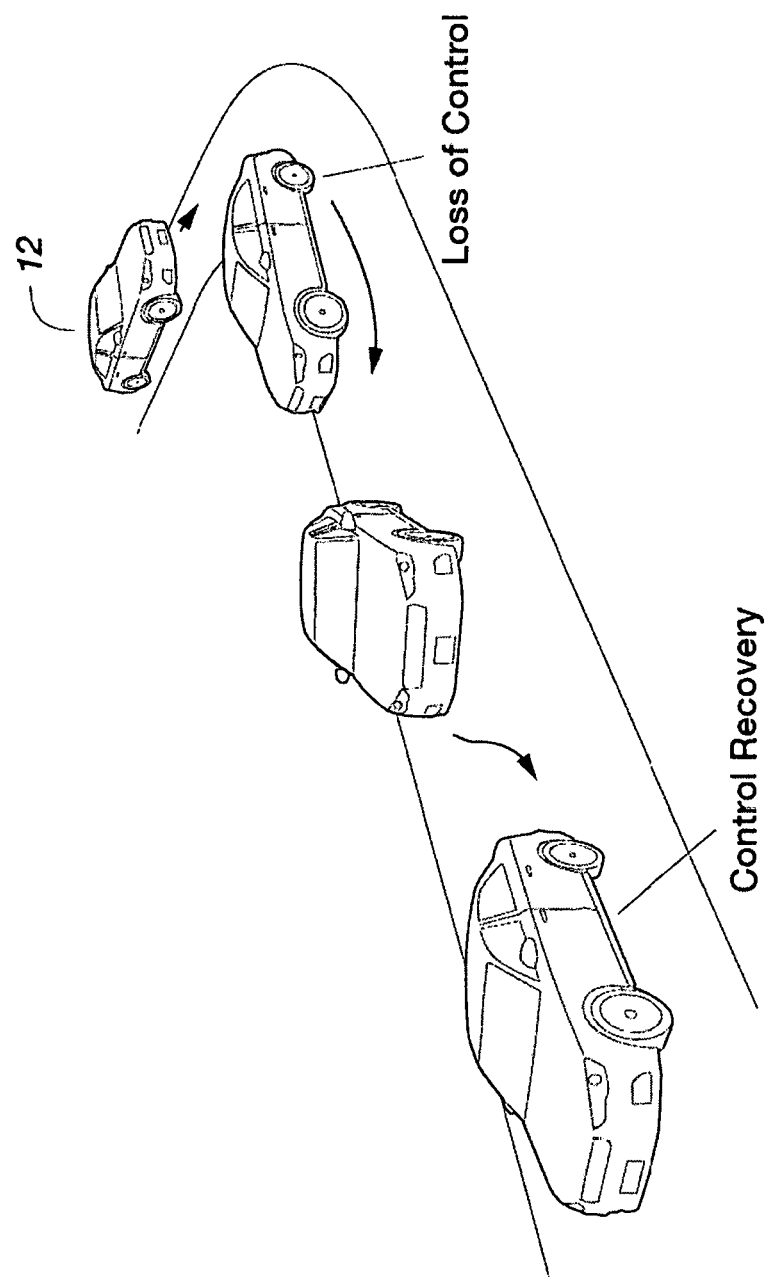

FIG. 14 supplies a schematic view of a ground vehicle which employs an alternative embodiment of the invention to recover after loss of control.

Figure 15:
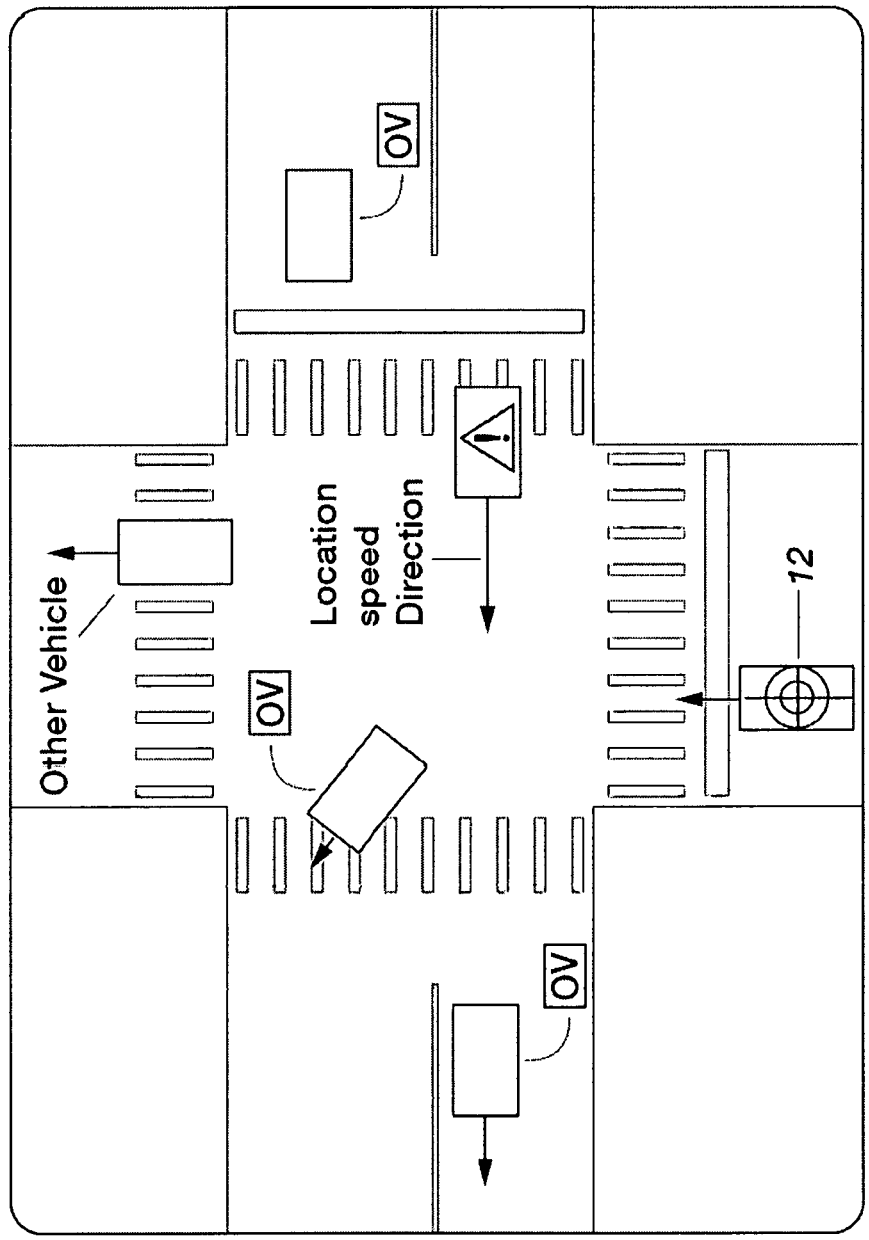

FIG. 15 depicts an In-Vehicle Interface Display for a ground vehicle that may be used in an alternative embodiment of the invention.

Figure 16:
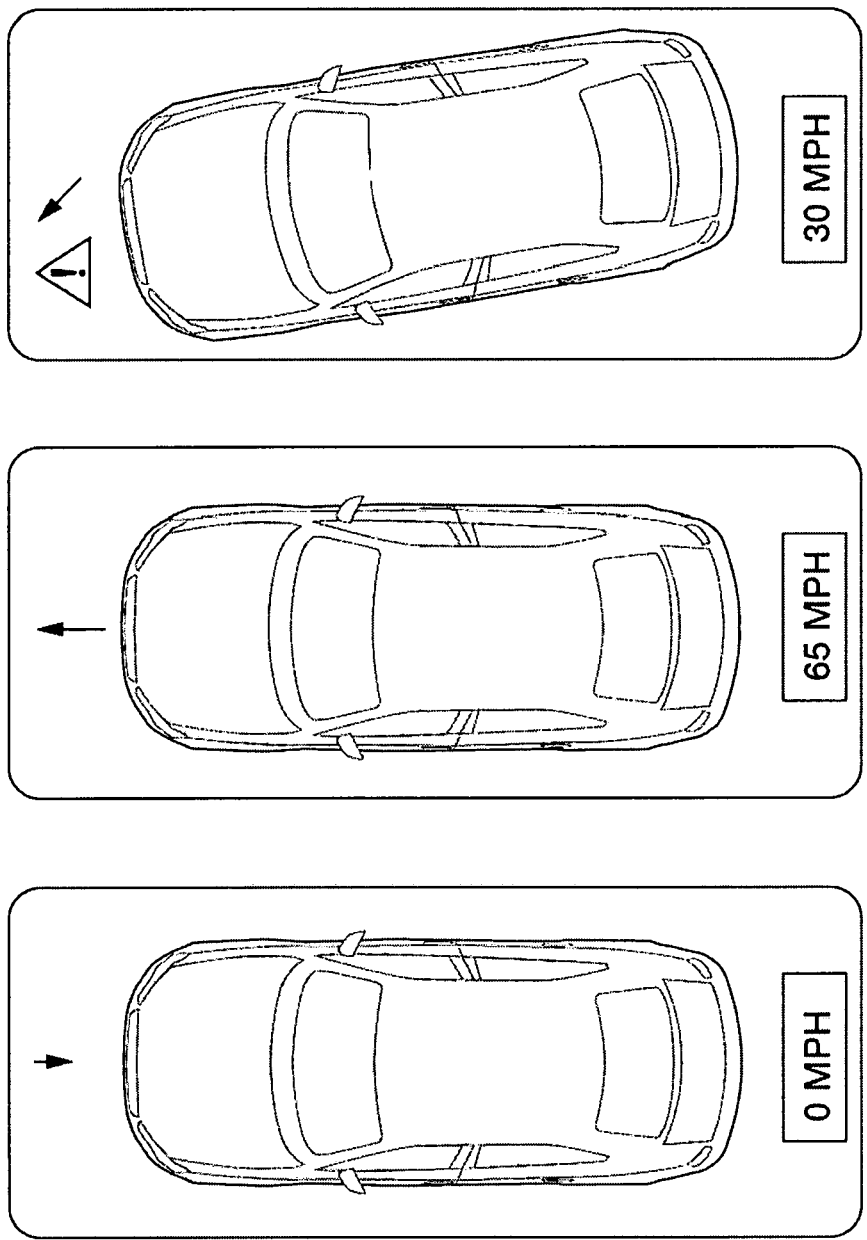

FIG. 16 depicts another view of an In-Vehicle Interface Display for a ground vehicle that may be used in an alternative embodiment of the invention.

Figure 17:
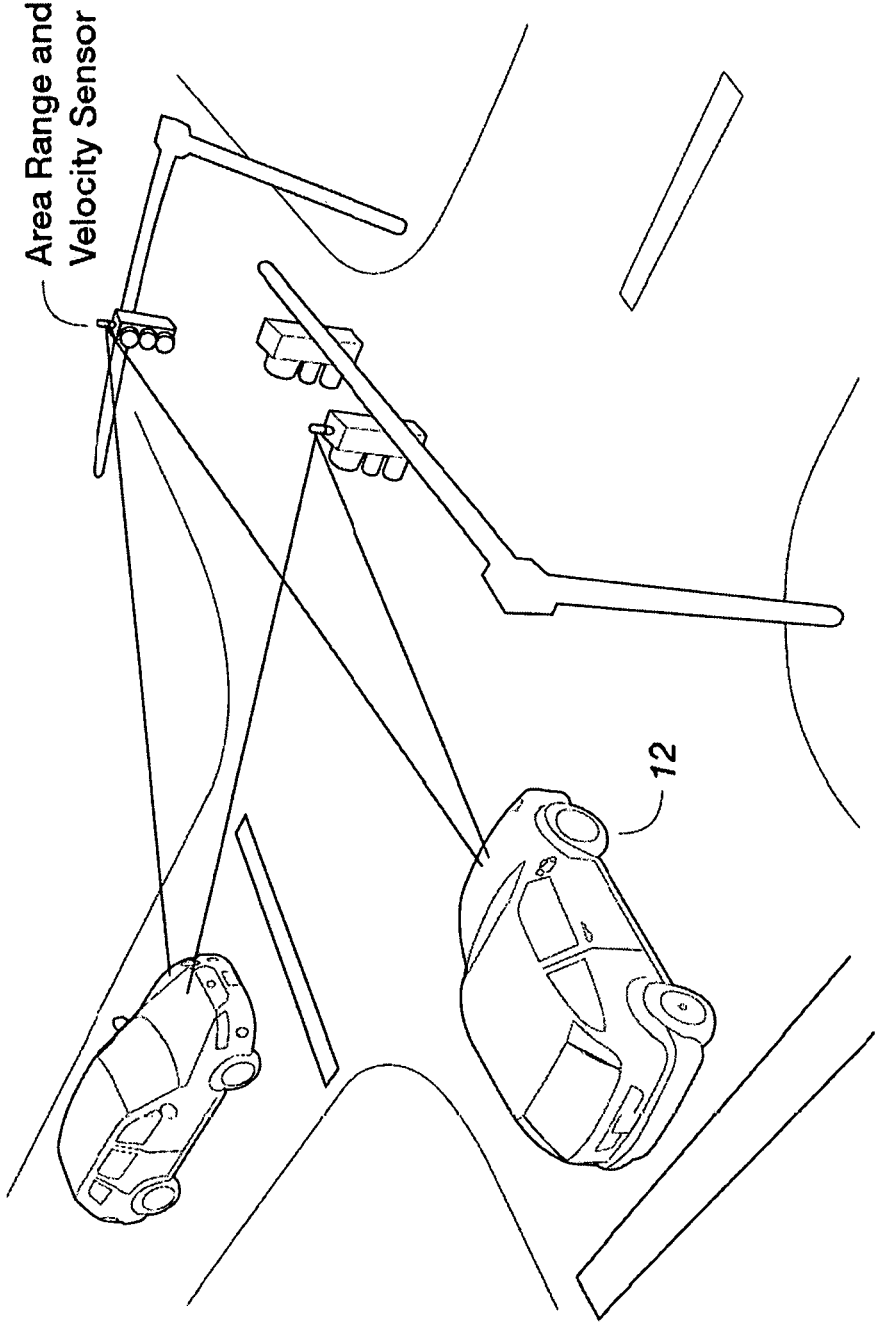

FIG. 17 is a schematic view of an Intelligent Transportation System that includes Area Situational Awareness.

Figure 18:
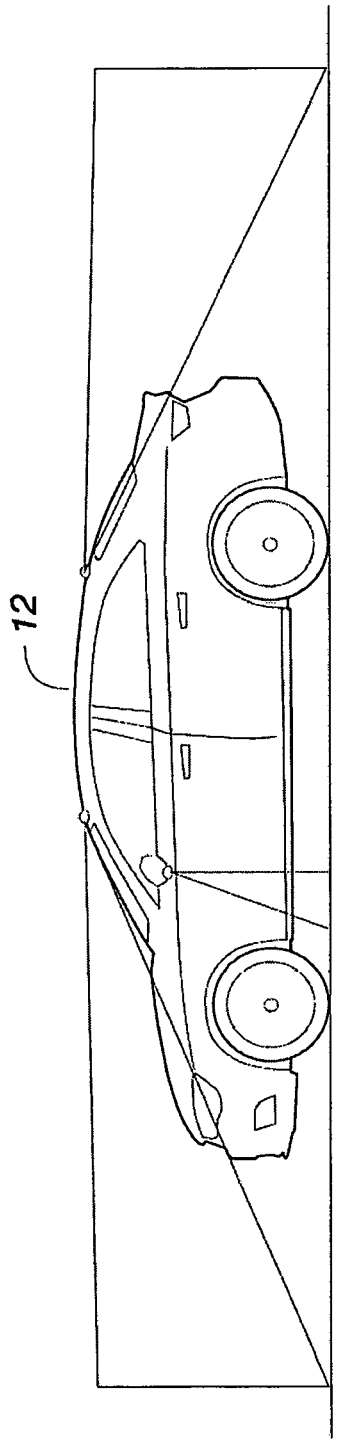

FIG. 18 is a schematic view of an Intelligent Transportation System that includes Area Situational Awareness.

Figure 19:
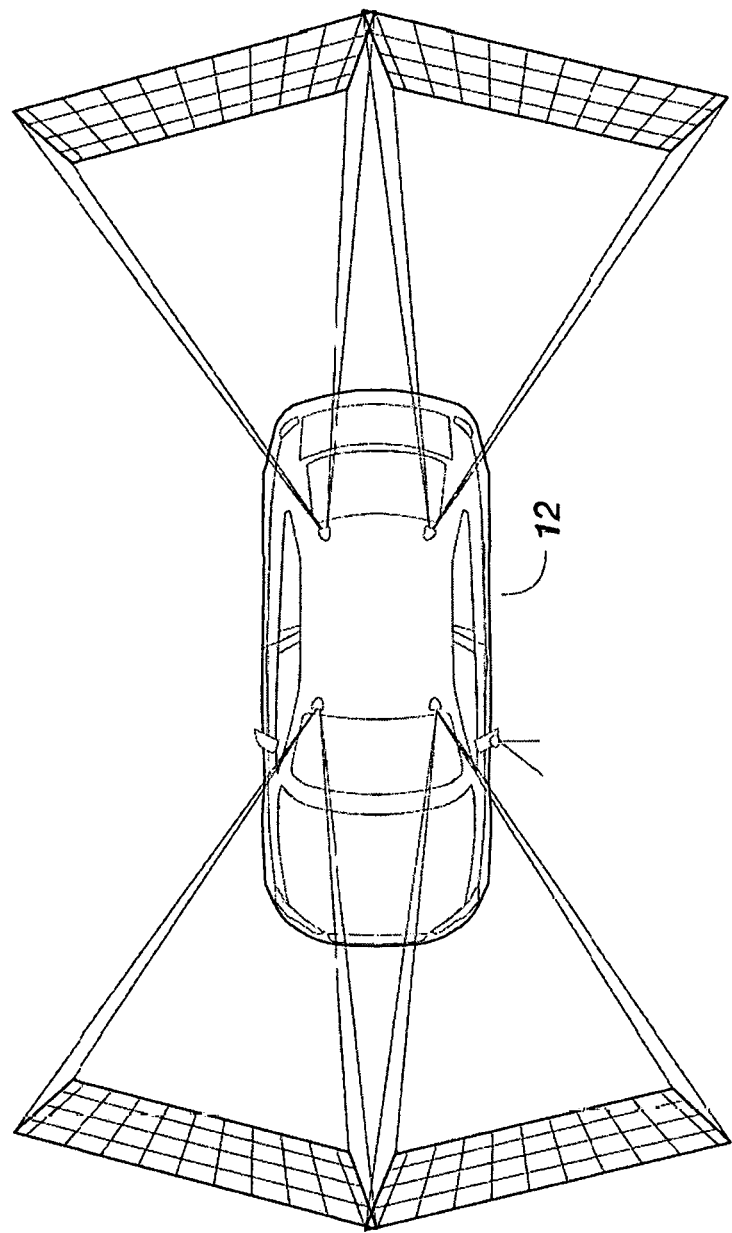

FIG. 19 provides yet another schematic view of which illustrates Situational Awareness and Hazard Avoidance.

FIG. 19 furnishes another schematic view of a ground vehicle which utilizes Situational Awareness and Hazard Avoidance.

Figure 20:
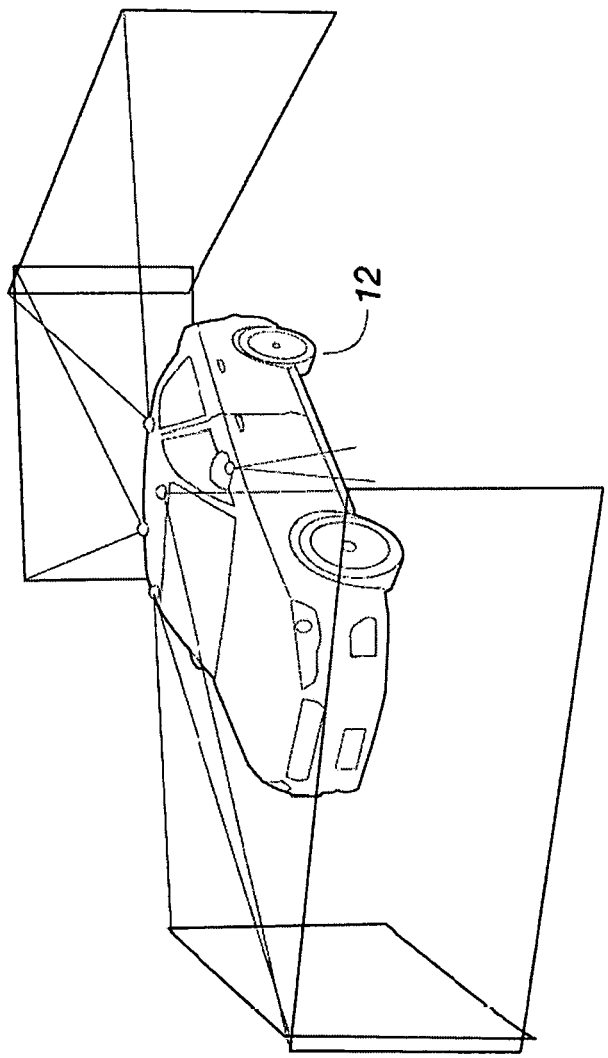

FIG. 20 exhibits another schematic view of a ground vehicle which utilizes Situational Awareness and Hazard Avoidance.

Figure 21:
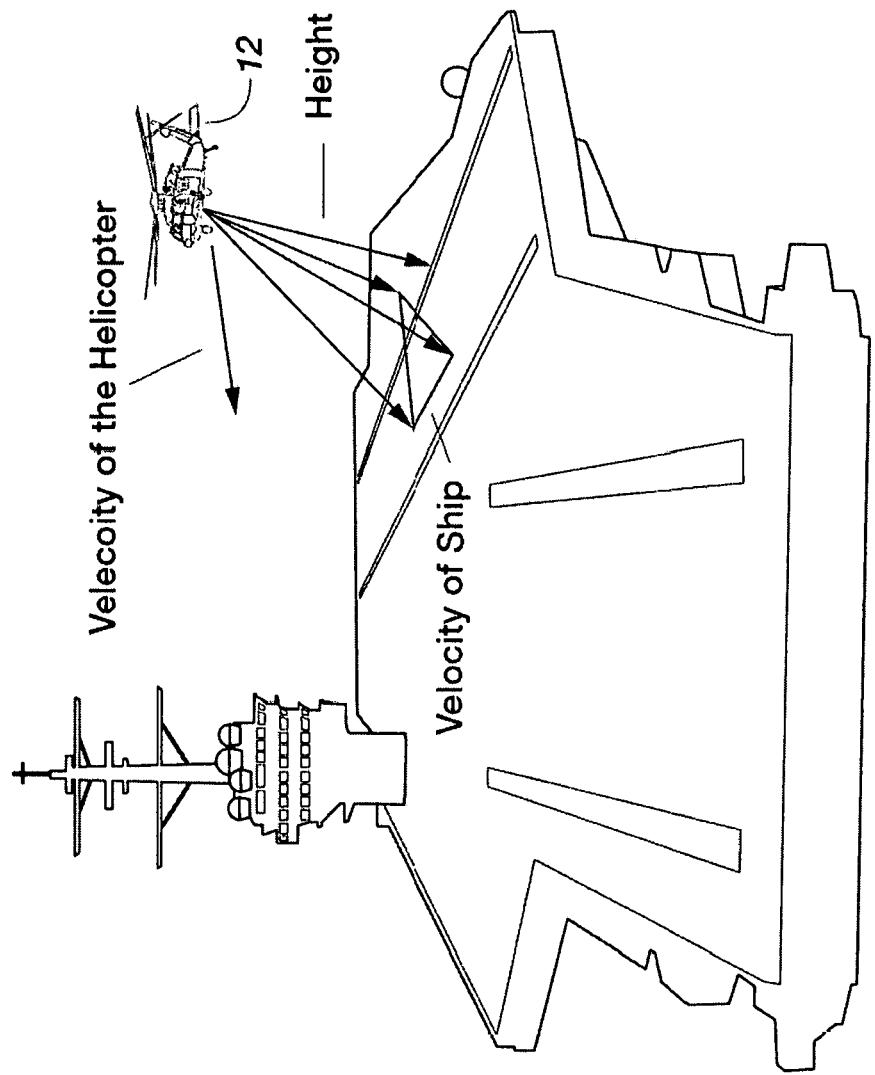

FIG. 21 offers a schematic view of yet another alternative embodiment of the present invention, showing an aircraft landing on the deck of an aircraft carrier.

A DETAILED DESCRIPTION OF PREFERRED & ALTERNATIVE EMBODIMENTS

I. Overview of Preferred & Alternative Embodiments the Invention

The present invention enables stealthy, self-reliant, accurate, long-distance navigation by using laser light and coherent receivers configured to provide speed in the sensor frame of reference, and with respect to objects and other vehicles in its environment. The use of laser light means detection by adversaries is extremely difficult and also provides high precision measurements. Coherent receivers allow very high signal-to-noise ratio (SNR) measurements of speed along the laser beam line of sight with very low probability of interference from other nearby laser based signals. For ground and aerial systems distance and velocity measurements are relative to the plane formed by the ground. Using more than one beam, the present invention measures speed with respect to the ground or the other objects/vehicles in more than one direction allowing either 2-D or 3-D position determination as well as other useful vehicle state parameters, including the speed and direction of the other objects/vehicles in its environment (sensor reference frame). A clock and heading information updates using compass, gyroscope, star tracker and/or a terrain matching system completes the fully self-contained navigation system.

In situations where it is not desired or feasible to provide human control or when human abilities are inadequate for safe operations, it is necessary for vehicles to autonomously plan their trajectory, navigate to their destination and control their position and attitude. To safely and reliably accomplish this objective, they must be able to sense their environment with enough accuracy and precision to make and execute appropriate decisions. Clutter free, high signal to noise ratio velocity and range measurements offer a particularly elegant solution.

Specific problems demanding this system include navigating or landing on heavenly bodies without human aid, rendezvous and proximity operations (inspection, berthing, docking) in space, driverless cars, trucks and military vehicles, aerial vehicles in GPS denied environments.

Current navigation systems use inertial measurement systems that accumulate velocity errors relatively quickly leading to large uncertainties in a vehicle's position after relatively short periods of time. Space-based or ground based beacons like GPS or LORAN (Long Range Navigation) can provide position information through triangulation techniques but are susceptible to hostile actors who can either jam these signals or worse spoil them such that they provide undetectably incorrect position readings. Previous systems use sensors like accelerometers, oscillators, gyroscopes, odometers and speedometers of various types, GPS signals, other triangulation beacon systems, cameras, RADAR (Radio Detection and Ranging), SONAR (Sound Navigation and Ranging), and LIDAR (Light Detection and Ranging).

These fall into two groups: onboard sensors and externally delivered information signals. The limitations of the onboard sensors are their systematic errors which accumulate over time and give inadequate knowledge for accurate navigation, and a high degree of multi-target clutter, confusing signal interpretation. The limitation of externally delivered signals is their availability. They are not available underground or in space and can be jammed or spoofed on Earth.

Current navigation systems use inertial measurement systems that accumulate velocity errors relatively quickly leading to large uncertainties in a vehicle's position after relatively short periods of time. Space-based or ground based beacons like GPS or LORAN can provide position information through triangulation techniques but are susceptible to hostile actors who can either jam these signals or worse spoil them such that they provide undetectably incorrect position readings. The present invention allows accurate navigation with generally insignificant errors over long periods of time using only onboard instruments allowing vehicles to be self-reliant for navigation information.

Previous on-board navigation systems can use radar to provide navigation information superior to inertial measurement systems that use gyros or accelerometers but these also provide hostile actors with knowledge of the trajectory of the vehicle. The present invention allows accurate navigation and very low probability of detection by other entities and faster environmental situational awareness.

The key advantages of the present invention over previous systems are the low systematic error and the low chance of detection due to the nature of the light used to determine the navigation parameters. The uniqueness of the present invention's detection methodology provides clutter free, closed-channel signal acquisition making the system able to operate in a high target traffic environment.

Combining both reference sensors and sense-and-avoid sensors into a single system will provide critical data at an accuracy and speed unavailable until now.

The reference sensor allows the sense and avoid sensor to deliver referenced velocities for the objects in its environment. In turn the situational sensors provide additional data that can improve the reference sensor measurements, especially for guidance, navigation and control purposes.

The present invention provides key information to vehicle guidance, navigation and control systems, specifically, velocity vectors and range, with derivable information about surface relative attitude, side-slip angle, angle of approach, and altitude. These parameters measured with high accuracy enable safe and reliable human driven and autonomous cars and trucks and enable aerial vehicles (with and without pilots) to navigate without GPS or other external signals. In current cars, one embodiment of the present invention enables automobiles to recover from currently uncontrollable spins and situations where the vehicle is sliding sideways or spinning and cannot determine their position or direction.

One embodiment of the present invention enables safe and reliable human driven and autonomous cars and trucks and enables aerial vehicles (with and without pilots) to navigate without GPS or other external signals. In current cars, one embodiment enables automobiles to recover from currently uncontrollable spins and situations where the vehicle is sliding sideways or spinning and cannot (with previous systems) determine their position or direction.

The present invention may be implemented in ADAS 3-5 (Advanced Driver Assistance) vehicles, both civilian and military as well as piloted and unpiloted aircraft, especially those requiring VTOL (Vertical Take Off and Landing) and the capability to fly without GPS navigation signals. Another embodiment of the invention may be used as navigation sensors for crew and cargo delivery to planetary bodies such as the Moon, Mars or asteroids by commercial space companies.

II. A Detailed Description of One Embodiment of the Invention

Figure 1:
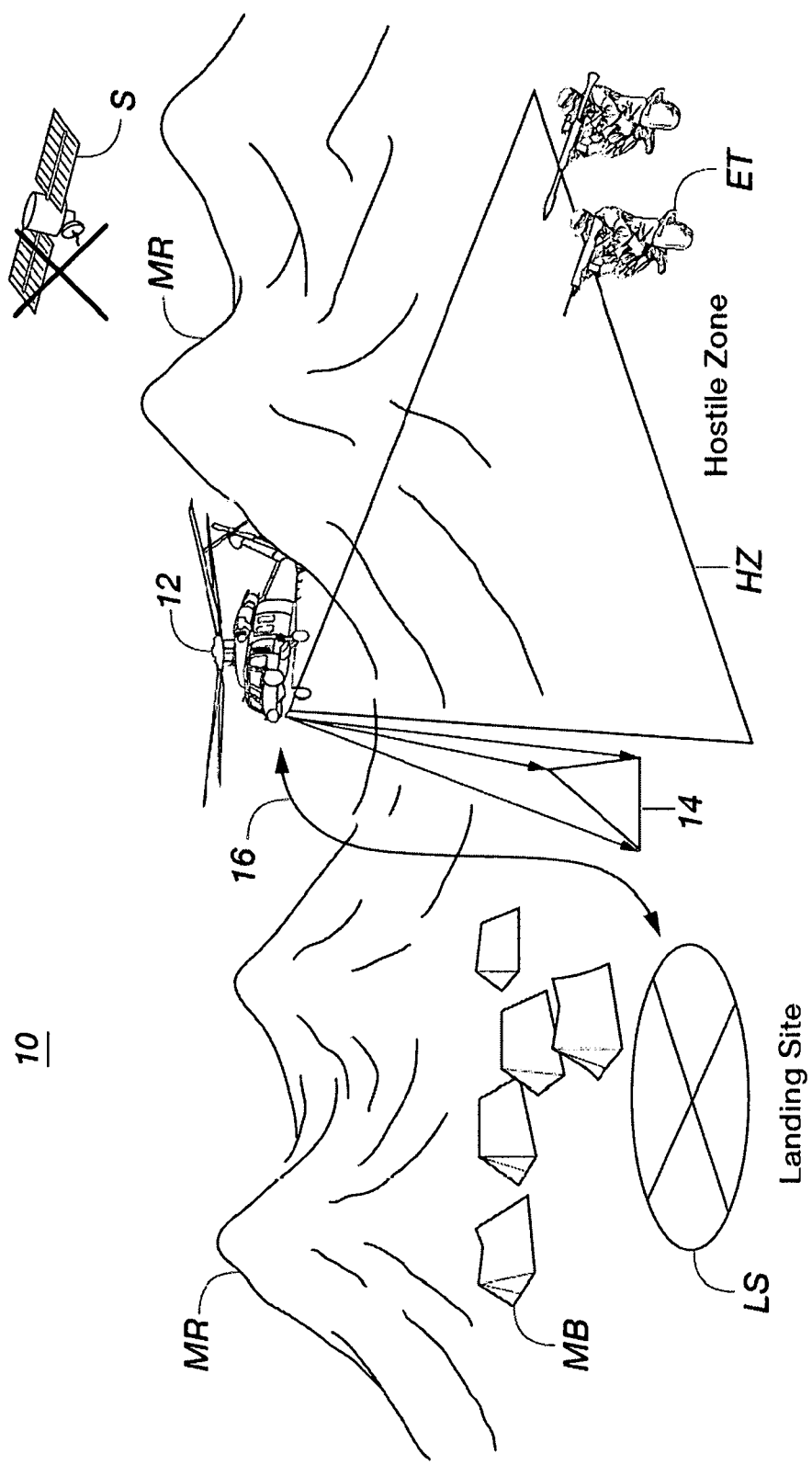
FIG. 1 is a generalized view of one embodiment of a System for Navigation in a GPS Denied Environment.

FIG. 1 is a generalized view of one embodiment of the present invention 10, which is utilized in a GPS Denied Environment. A GPS satellite S is shown over the landscape shown in FIG. 1, but is unavailable to provide navigation services, due to the efforts of hostile or unfriendly forces in the area. These hostile or unfriendly forces may be jamming or spoiling GPS signals with specialized radios.

An airborne vehicle 12, such as a helicopter, is shown flying over a hostile zone HZ bordered by a mountain range MR. The hostile zone HZ is populated by enemy troops ET, who are capable of firing on the helicopter 12.

The helicopter 12 is attempting to avoid the mountain range MR, as well as the enemy troops ET, and is attempting to land on a landing site LS near a friendly military base MB.

The helicopter 12 has an on-board navigation system which embodies the various embodiments of the present invention, and which is described in detail below. The on-board navigation system illuminates a portion of the ground 14, and computes the optimal approach path 16 that will enable the helicopter 12 to land safely on the landing site LS.

FIG. 2 is a schematic view 18 of generalized sensor system reference frames for three dimensions that are employed by the present invention. FIG. 2 shows both an airborne vehicle, 12, and a target 20. FIG. 2 depicts a universal reference frame 22, a three-dimensional vehicle reference frame 24, a sensor reference frame 25, and a three-dimensional target reference frame 26. The universal reference frame 22 is generally defined by a plane that is associated with the terrain below the vehicle 12 and the target 20. In space, it could be defined by the features of another spacecraft.

Both the vehicle reference frame 24 and the target reference frame 26 are characterized by a Cartesian Coordinate set of three axes. The directions defined by the axes are labeled x, y and z. These directions and the rotation around each axis define six degrees of freedom.

The on-board navigation system implemented in one embodiment of the invention illuminates a portion of the universal reference frame 22, one or more targets 20 and/or other objects. This on-board navigation system utilizes a variety of sensors, which are described in detail in this Specification. Unless these sensors are placed exactly at the center of mass and center of inertia of the vehicle 12, then there is a difference between the sensor reference frame 25 and the vehicle reference frame 24.

FIG. 3 is a similar schematic view 27 of generalized sensor system reference frames 18, but only shows the two dimensions of freedom available for a ground vehicle that are employed by the present invention. FIG. 3 shows a vehicle, 12, and a target 20. FIG. 3 depicts a universal reference frame 22, a planar vehicle reference frame 28, and a planar target reference frame 30. The universal reference frame 20 is generally defined by the plane that is associated with the terrain on which the vehicle 12 and the target 20 are located.

Both the vehicle reference frame 28 and the target reference frame 30 are characterized by a Cartesian Coordinate set of two axes. The directions defined by the axes are labeled x and y. These directions and rotation around the vertical or yaw define three degrees of freedom.

FIG. 4 provides a schematic view 32 of a generalized vehicle 12. The location of the vehicle 12 is characterized by three Cartesian Coordinates, and is measured along the three axes of a vehicle reference frame 24 located by definition at the center of mass of the vehicle. The generalized vehicle 12 carries a navigation system on-board which implements the various embodiments of the present invention. A location processor 34 is connected to a heading sensor 36, an absolute location sensor 38, and a timer 40. A range Doppler processor 42 is connected to a Navigation Reference Sensor (NRS) 44 and an Area Range & Velocity Sensor (ARVS) 46.

FIG. 5 offers a schematic block diagram which shows the details of the Navigation Reference Sensor (NRS) 44. A narrow linewidth emitter 48 is connected to a waveform generator 50, which, in turn, is coupled to both a transmitter 52 and a local oscillator 54. The transmitter 52 is connected to a transmit/receive boresight 56 and a receiver 58. The local oscillator 54 is also connected to the receiver 58. A static beam director 60 is connected to the transmit/receive boresight 56. The static beam director 60 emits and collects LIDAR beams 62.

FIG. 6 offers another schematic block diagram which shows the details of an Area Range & Velocity Sensor (ARVS) 46. A narrow linewidth emitter 64 is connected to a waveform generator 66, which, in turn, is coupled to both a transmitter 68 and a local oscillator 70. The transmitter 68 is connected to a transmit/receive boresight 72 and a receiver 74. The local oscillator 70 is also connected to the receiver 74. A dynamic beam director 76 is connected to the transmit/receive boresight. The dynamic beam director 76 emits and collects variable direction LIDAR beams 78.

FIG. 7 is a flow chart 79 that portrays method steps that are implemented by the Range Doppler Processor 42 in one embodiment of the present invention.

82 Demodulate receiver output.

84 Determine spectral content.

86 Discriminate signal frequencies from noise. These signal frequencies are the Doppler shifted frequency and the sidebands on the Doppler shift frequency.

88 Obtain velocity from signal frequency Doppler Shift. By determining the Doppler frequency itself, the speed along the beam direction of travel is calculated.

90 Obtain distance from signal frequency side bands. By determining the sideband frequencies, the range to the target or object is calculated.

92 Convert range and velocity frequencies to engineering units.

94 Send data to Location Processor.

FIG. 8 supplies a flow chart 96 that illustrates method steps that are implemented by the Location Processor 34 in one embodiment of the present invention. The steps shown in FIG. 8 are:

98 Obtain range and velocity of universal reference frame in sensor reference frame.

100 Obtain attitude and heading of universal reference frame relative to sensor frame.

102 Apply translation/rotation transformation of sensor case frame to vehicle frame (center of gravity).

104 Apply translation/rotation transformation of vehicle frame relative to universal reference frame.

106 Obtain range and velocity of target in sensor reference frame.

108 Obtain attitude and heading of a target relative to sensor frame.

110 Apply translation/rotation transformation of sensor case frame to vehicle frame (center of gravity).

112 Apply translation/rotation transformation of target relative to universal reference frame.

The steps labeled 98, 100, 102, and 104 converts to engineering units the range and velocity of the vehicle 12 reference frame relative to a universal reference frame.

The steps 106, 108, and 110 convert to engineering units and transform coordinates for the range and velocity of the vehicle 12 reference frame relative to plurality of target reference frames.

Step 112 transforms coordinates from the target reference frames to the universal reference frame.

FIG. 9 is an illustration 114 of the displays that convey navigation information to the pilot of the vehicle 12. Surface relative velocity is presented on instruments that show Vx 116, Vy 118 and Vz 119. FIG. 9 also depicts other navigation information for the vehicle 12, including surface relative altitude 120, flight path angle 122, the velocity vector 124, the angle of attack 126 and the surface relative pitch angle 128.

FIG. 10 is an illustration 130 that portrays navigation attributes concerning the vehicle 12, including the side-slip angle 132 and the surface relative roll angle 134.

III. Embodiments of the Invention that May be Used for GPS-Denied Environments In one embodiment, the NRS 44 uses a coherent LIDAR system with a static beam director 62 to measure vehicle reference frame 24 speed and distance relative to the universal reference frame 22 in one or more directions, such that said speed and distance measurements can be used by the Range Doppler Processor 42 and the Location Processor 34 to determine planning, guidance, navigation and control parameters. The NRS 44 uses a narrow linewidth emitter 48 modulated by a waveform generator 50 to provide a transmitted signal to the universal reference frame 22 and a Local Oscillator 54 that goes to the receiver 58. The transmitter signal is aligned to the receiver 58 by the boresight 56 and pointed to the universal reference frame 22 by the static beam director 60.

In one embodiment of the present invention, an Area Range and Velocity Sensor (ARVS) 46 is employed to determine the location and velocity of one or more targets 20. The target 20 may be another aircraft, a building, personnel or one or more other objects.

In one embodiment of the invention, the Navigation Reference Sensor (NRS) 44 may utilize a GPS receiver, or a terrain relative navigation camera and map, or a star tracker to obtain its initial location.

The ARVS 46 uses a coherent LIDAR system with a dynamic beam director 76 to measure vehicle reference frame 24 speed and distance relative to a target reference frame 26 in one or more directions, such that the speed and distance measurements can be used by the Range Doppler Processor 42 and the Location Processor 34 to determine planning, guidance, navigation and control parameters. The ARVS 46 uses a narrow linewidth emitter 48 modulated by a waveform generator 50 to provide a transmitted signal to a target 20 and a Local Oscillator 54 that goes to the receiver 58. The transmitter signal is aligned to the receiver 74 by the boresight 72 and pointed to a target 20 by the dynamic beam director 76.

In one embodiment, the Absolute Location Sensor (ALS) 38 is used to determine an absolute location in the universal reference frame of a vehicle or platform 12 at certain intervals. The ALS 38 provides the starting fix for the location processor. Alternative methods for obtaining a starting location include using a GPS receiver, a terrain matching camera, a LIDAR system, and/or a star tracker.

In one embodiment, one or more heading sensors 36 provide the absolute orientation to the universal reference frame 22 of the vehicle 12. Heading sensors 36 indicate the direction of travel with respect to the universal reference frame 22. Alternative methods for determining the direction of travel relative to some reference frame include using a compass, a star tracker, or a terrain matching system.

One embodiment of the invention uses a timer to measure durations of travel over periods of constant speed and heading. The accuracy of the clock is driven by the need for accuracy in the location that is being determined. Errors in timing translate directly into errors in location. Each user has their own requirement on location accuracy, and, therefore, on the timer accuracy. The clock has a level of precision and accuracy that are sufficient to meet the navigation error requirements.

The user's navigation error requirements determines the clock or timer accuracy and precision. Since location is given by the product of velocity and time, location error is related linearly to clock errors for a given velocity.

The Range-Doppler Processor 42 combines the Doppler-shift information from the Doppler-shift receivers in the NRS 44 and ARVS 46.

One or more processors demodulate, filter, and convert the collected time-domain signals into frequencies from where spectral content information is retrieved. This information includes Doppler frequency shifts that are proportional to target velocity, and sideband frequencies that are proportional to the distance to a target. The Range Doppler Processor contains one or more computer processor units (CPU). One of these CPU's may accomplish the filtering task, while another demodulates the signal.

The Location Processor 34 and its algorithm 96 combine heading, range, velocity and timing and previous locations data from various sensors (guidance, navigation and control computer).

Each NRS and ARVS 46 includes a narrow linewidth emitter, which is a coherent electromagnetic radiation source with a linewidth controller such as a grating or filter. The linewidth of the source provides the accuracy limitation to the range and velocity measurements. The linewidth of the emitter refers to the spectral distribution of instantaneous frequencies centered about the primary frequency but containing smaller amplitudes on either side, thus reducing the coherence of the emitter. One embodiment of the emitter is a semiconductor laser with a gain-limited intra-cavity spectral filter.

In one embodiment, the linewidth is 100 kHz or less: $f=c/\lambda=3\times10^8$ m/sec divided by $1.5\times10^{-6}$ m=200 THz; or 1 part in 10-12. This linewidth is scalable with the frequency of the emitter.

A waveform generator manipulates the frequency, phase, or amplitude of the emitter to serve as an interrogation or communication method to the carrier wave. Frequency, phase, or amplitude modulation is performed by applying perturbations in time or space, along the emitter's path, thus adjusting the waveform. One embodiment of the modulator is an electro-optic crystal. A second embodiment of the modulator is an acousto-optic crystal. Another embodiment of the modulator is variations in current or temperature of an emitter.

The modulator creates a spectrally pure, modulated carrier frequency that has an identically (1 part in $10^3$) linear frequency increase as a function of time, from which distance measurements are made entirely in the frequency domain.

One embodiment of the invention utilizes a very high signal-to-noise Doppler-Shift Receiver. The Doppler frequency shift of radiation reflected from moving targets, planes, or references are obtained in the frequency domain using Doppler-shift receivers. In these receivers, the signal electromagnetic field to be detected is combined with a second electromagnetic field referred to as the Local Oscillator 70. The local oscillator field is very large compared to the received field, and its shot noise dominates all other noise sources. The spectrally coherent shot noise of the local oscillator serves as a narrow bandwidth amplifier to the signal, providing very high signal-to-noise, surpassing the signal-to-noise of the more common direct detection receivers. The high degree of coherence obtained by the Narrow Linewidth Emitter 64 and Local Oscillator 70 prevent stray light or external emitter electromagnetic radiation to be detected by the Receiver 74. This unique capability enables high signal-to-noise detection even in very high traffic electromagnetic environments. Each Receiver 58 & 74 obtains a unique measurement of distance and velocity along its pointing line of sight. In this embodiment, high signal-to-noise ratio is generally greater than 10:1.

In one embodiment of the invention, the sensor receivers are boresighted with the emitters. The boresight of the electromagnetic radiation direction between the transmitter 68 and the receiver 74 allows the target-reflected transmitted radiation to be captured by the receiver 74. Every vehicle will have a different range of angular space based on its needs. It is necessary to use more than one emitter when there is more than one translational degree of freedom. A train has one translational degree of freedom. A car has two degrees, and airplane or spacecraft has three.

In one embodiment of the invention, the beam director is typically fixed in the NRS 44, but is movable in the ARVS 46. The beam director determines where the transmitted radiation is pointed, and, therefore, determines a range to a selected target 20. The beam director both transmits and collects the return radiation. There is at least one beam director in the NRS and the ARVS. There is one beam director for each beam. For an aircraft, there are at least three individual static beam directors. For a car, there are at least two. There are as many dynamic beam directors as are needed for situational awareness.

In one embodiment of the present invention, a vehicle 12 carries the combination of hardware and/or software that is employed to implement the invention. In one embodiment, the vehicle 12 is a helicopter, or some other aircraft. In another embodiment, the vehicle 12 may be ground-based, like an automobile or a truck. In yet another embodiment, the vehicle 12 may be a satellite in orbit. In still another alternative implementation of the invention, the combination of hardware and/or software that is used to operate the invention may be installed on a stationary platform, such as a building or utility pole.

In one embodiment of the invention, the Area Range and Velocity Sensor (ARVS 46) may utilize a scanning time of flight LIDAR system, or a flash time of flight LIDAR system, or a number of cameras with photogrammetry.

In one embodiment, the Absolute Location Sensor 38 may include a GPS receiver. In another embodiment, the Absolute Location Sensor 38 may include a terrain relative navigation camera and map.

The Heading Sensor 36 may implement the present invention using a compass, a star tracker, a terrain matching system or an inertial measurement unit.

The timer may comprise any oscillator with sufficient accuracy to meet navigation requirements and a counter.

The Range Doppler Processor (RDP) 42 may include any microprocessor which is able to combine the Doppler-shift information from the Doppler-shift receivers in the NRS 44 and ARVS 46. These functions include demodulation, filtering, and converting the collected time-domain signals into frequencies from where spectral content information is retrieved. This information includes Doppler frequency shifts proportional to target velocity, and distance to target.

The output of the Doppler-shift receivers (58 & 74) are demodulated. The Doppler-shift receiver or optical detector demodulates the optical waveform returning from the target 20 by mixing it with the Local Oscillator 54 (also an optical waveform with the same (called homodyne) or very nearly same (called heterodyne) frequency). When the output of the Doppler-shift receivers are demodulated, then the spectral content of the receiver output over a limited range is determined. The demodulation step moves or removes the frequencies in the spectrum that are unwanted, and allows the signal to be processed. This step narrows the range of frequencies where the next steps look for and specifically determine the signal frequencies.

In the various embodiments of the invention, the Location Processor 34 may be any microprocessor that is able to combine heading, range, velocity, timing and previous location data from the various sensors (guidance, navigation and control computer).

In one embodiment of the invention, the Narrow-Linewidth Emitter (NLE) is a semiconductor laser combined with an intra-cavity filter. In another embodiment, a fiber laser with an embedded grating may be employed. In other embodiments, the NLE may include a solid state laser with active cavity length control, a RADAR system, or a microwave source.

In the various embodiments of the invention, the waveform generator or waveform generator may utilize an electro-optical crystal, an acousto-optical crystal or a direct laser control with temperature. The waveform generator controls the frequency content of the transmitted beam. The frequency of the laser may be changed by changing the temperature of the laser. The frequency of the laser may also be changed by changing the current through the laser.

In one embodiment of the invention, the Doppler shift receiver, which is selected so that it provides a very high signal-to-noise ratio, includes an interferometer, a filter-edge detector, a homodyne detector or a heterodyne detector.

A boresight circuit that is used to implement the invention may offer fixed or active control. Any circuit which is capable of aligning the beams that are emitted by the transmitter and collected by the receiver may be employed.

In implementing the various embodiments of the present invention, the beam director may be designed so that it includes a telescope, a scanning mirror, microelectromechanical arrays of mirrors, phased arrays, a grating or a prism.

V. Detailed Descriptions Alternative Embodiments of the Invention that May be Used in Combination with Conventional and/or Autonomous Vehicles

A. FIGS. 13-21

FIG. 13 shows a car navigating through a large city where GPS signals are not available. The Reference Sensor enhances this navigation. FIG. 13 also shows the Area Sensor providing local navigation information about hazards by probing other vehicles or objects with beams moving essentially horizontal to the ground.

FIG. 14 shows a car losing control on a turn and then recovering. This control recovery possible because our system of Reference and Area Sensors along with other sensors already available like an IMU, cameras, etc. allow the car to keep up with where it is in rotation and translation and therefore use its control mechanisms to recover safely.

FIG. 15 shows a display that may be used in the vehicle shown in FIG. 13.

FIG. 16 shows another display that may be employed in the vehicle in FIG. 14.

FIG. 17 depicts the measurement of the location, speed and direction of vehicles in the vicinity of an intersection. Autonomous cars have the ability to receive data like this from external sources to enable better traffic flow management.

FIG. 18 shows the field of view of the Area Sensors mounted at the top of the front and rear windshields from a side view.

FIG. 19 shows the field of view of the Area Sensors mounted at the top of the front and rear windshields from a top view.

FIG. 20 is a view of a vehicle combined with situation awareness and hazard avoidance.

FIG. 21 shows the Reference Sensor used to land on a moving platform like a ship deck. It allows the control system to make a soft landing by tracking the distance and speed of the deck with respect to the helicopter.

B. Overview of Alternative Embodiments

FIGS. 13-21 generally provide schematic illustrations of applications of alternative embodiments of the invention. FIGS. 13-20 pertain to vehicles 12 which generally travel, translate or otherwise move on, near or under the ground, while FIG. 21 pertains to the interaction of water-borne and airborne vehicles 12. All of the vehicles 12 shown in FIGS. 13-21 and described in Section II of the Detailed Description, such as cars, buses, trucks, trains, subways or other near-surface conveyances may utilize some combination of elements of the Invention shown in FIGS. 1-12 and described in Sections I, II, III and IV of the Detailed Description.

All of the vehicles 12 shown in FIGS. 13-21 and described in Section V of the Detailed Description provide specific enhanced navigation benefits to users of either conventional and/or driverless vehicles that are obtained only through the implementation of and combination with the elements of the Invention shown in FIGS. 1-12 and described in Sections I, II, III and IV of the Detailed Description.

In the case of ground vehicles such as automobiles and trucks, various implementations and/or variations of the navigation system hardware shown in FIGS. 1-12 may be installed near an engine, within a passenger compartment, in cargo storage areas, or in some other suitable space. This navigation system hardware is connected to sensors, emitters, antennas or other transmit and/or receive elements by conductive cables, fibers, wireless links, or other suitable data pathways. Some or all of these sensors, emitters, antennas or other transmit and/or receive elements may be mounted on, embedded in or otherwise affixed, coupled or attached to appropriate surfaces or structures of a vehicle, or on nearby surfaces and/or structures, such as roads, bridges, highways, freeways, embankments, berms, ramps, toll booths, walkways, drainage culverts, fences, walls, tracks, tunnels, stations, platforms, signage, traffic signals, motorcycles, bicycles, pedestrians, pets, animals, parking spaces, fire hydrants, standpipes, buildings or other facilities, appurtenances, appliances, equipment, cables, hazards, or objects.

C. Collision Avoidance & Ancillary Safety Systems for Ground Vehicles that May be Used in Combination with the Enhanced Navigation System Provided by the Present Invention According to Cartelligent, crash prevention systems typically include forward collision warning, auto-braking, lane departure warning, lane departure prevention, blind spot detection, and adaptive headlights:

"Forward collision warning systems use cameras, laser beams and/or radar to scan the road ahead and alert the driver to any objects in the road ahead. If the system detects an object that the driver does not appear to be reacting to it takes action. Some systems will sound an alert and prepare the brakes for full stopping power; others will apply the brakes automatically to prevent a crash."

"Lane departure warning systems use cameras to detect the lane markings on the road. If the driver moves outside of the marked lanes without using the turn signal, an alert appears. Typically this is a visual alert combined with an audible tone or vibration. Lane departure prevention takes this one step further by gently steering the vehicle back into its lane. The driver can bypass this system at any point by turning the steering wheel."

"Active blind spot detection systems, or blind spot monitoring systems, track vehicles as they approach the driver's blind spot. A visual alert is shown when another vehicle is currently occupying the blind spot. If the driver switches the turn signal to move into the occupied area, an audible tone or vibration is triggered. Blind spot intervention systems take this a step further by preventing the driver from moving into the space occupied by another vehicle."

"Adaptive headlights react to speed and direction to move the beams up to 15 degrees in either direction. This can be helpful when driving around a corner at night, allowing the driver to see objects in the road ahead that would be invisible with standard beams. Some vehicles combine these with cornering lights that can provide up to 80 degrees of additional side view when the car is moving slower than 25 mph (such as in a parking lot)."

"A recent study by the Highway Loss Data Institute (HLDI) found that Acura and Mercedes-Benz vehicles with forward collision warning and active braking had 14% fewer insurance claims filed for property damage compared to the same models without the technology. Adaptive headlights have also been shown by the HLDI to reduce property damage claims by 10% compared to the same vehicle with standard headlights."

"An IIHS survey of owners of vehicles with crash prevention technology found that the majority felt the system made them safer drivers and would want their next vehicle to have the same features. Depending on the vehicle, 20% to 50% of owners reported that the system had helped them to avoid a crash."

D. Automated Driving Using Advanced Control Technology that May be Used in Combination with the Present Invention The automaker, BMW, has demonstrated how highly automated driving using advanced control technology can cope with all driving situations right up to the vehicle's dynamic limits.

The BMWBlog describes:

"New sensors can be used to move to the next stage—fully collision-free, fully automated driving. This latest milestone from the BMW Group is a further step on the road towards accident-free personal mobility in both driver-operated and fully automated, driverless vehicles."

"Three hundred and sixty degree collision avoidance is based on precise position and environment sensing. Four highly advanced laser scanners monitor the surroundings of the research vehicle (a BMW i3) and accurately identify obstacles, such as pillars in multi-storey car parks. An audible signal warns the driver in a potential collision situation."

"As a last resort, for example if the vehicle is approaching a wall or pillar too quickly, it is also possible to initiate automatic braking, bringing the vehicle to a standstill with centimeter accuracy. If the driver steers away from the obstacle or reverses direction, braking is automatically interrupted. This function reduces strain on the driver in difficult-to-monitor driving environments for improved safety and convenience. Just like any other BMW assistance system, this research application can also be overridden by the driver at any time."

E. Self-Driving Vehicles Regulated by Collision Avoidance Systems that May be Used in Combination with the Present Invention Scientific American provides a summary of the combination of self-driving vehicles and collision avoidance systems:

"In the world of self-driving cars, all eyes are on Google. But major automakers are making moves toward autonomous driving, too. Although their advanced-safety and driver-assistance features may seem incremental in comparison, many are proofs of concept for technologies that could one day control driverless cars. At the same time, the National Highway Traffic Safety Administration (NHTSA), the arm of the Department of Transportation charged with establishing and enforcing car-safety standards and regulations, is studying and testing the road readiness of these control and machine-vision systems. In the short term, as buyers hold their breath for robotic cars, making automation features standard will save lives."

"In January of 2015, the NHTSA announced that it would begin to factor crash-preventing braking systems into its car-safety ratings. The systems use forward-facing sensors-which can be radar-, camera- or laser-based-to detect imminent collisions and either apply or increase braking force to compensate for slow or insufficient driver reactions. Honda was first to introduce such a system in 2003; since then, nearly every automaker has rolled out similar features on high- and mid-range models."

"Every new car sold after May 1, 2018, must have a backup camera, per a safety regulation issued by the NHTSA in 2014. The rear-facing cameras, available now on dozens of models, provide drivers with a full rear field of view and help to detect obstacles in blind spots. The NHTSA estimates that improving visibility in this way could save 69 lives every year."

"For self-driving cars to navigate roads en masse, each must have the position, speed and trajectory of nearby automobiles. Last summer the NHTSA announced that it would explore how to standardize such vehicle-to-vehicle communication. The feature could improve coordination for human and machine alike during accident-prone maneuvers, such as left-hand turns."

"In 2013 the NHTSA established how to test the effectiveness of camera systems that watch existing painted lane markers and alert drivers if they drift. Some cars, such as the Toyota Prius, now even take over steering if a driver does not respond quickly enough to warning signals. And new 2015 models from Mercedes-Benz and Volkswagen go further, using cameras and sensors to monitor surroundings and autonomously steer, change lanes and swerve to avoid accidents."

F. Sensors for Fully Autonomous Cars that May be Used in Combination with the Present Invention Automotive News reports on sensors for fully autonomous cars:

"The sensors needed for collision avoidance—radar, cameras, ultrasound and lidar—have become a big business already."

"Global sales of anti-crash sensors will total $9.90 billion in 2020—up from $3.94 billion this year, predicts IHS Automotive, a research firm based in suburban Detroit."

"Radar and cameras will account for the lion's share of that revenue, followed by ultrasound and lidar, according to the IHS forecast."

"Lidar, the sensor of choice used on Google's driverless car, will generate relatively small sales by 2020. It uses pulsed laser light to measure distances."

"Within a decade or so, say industry analysts, the array of collision-avoidance sensors will feed data to powerful onboard computers to create self-driving vehicles. Some planners also believe that safe autonomous driving also will require vehicle-to-vehicle communication enabled by wireless devices called transponders."

"Some suppliers are developing lidar sensors to back up radar and cameras for fail-safe lane changes."

"Each type of sensor has its strengths and weaknesses. Inexpensive ultrasound sensors are good at detecting obstacles at short distances, which makes them useful for assisted parking."

"Radar can accurately determine the distance and location of an obstacle in the road . . . but is not very good at identifying a cyclist, pedestrian or animal. Cameras, by contrast, are very useful for identifying the type of obstacle, but they have a shorter range than radar."

"Cameras can be affected by rain and dirt, while radar can be impaired by dense fog . . . but they are generally not susceptible to the same conditions, which is why they are so frequently paired in sensor fusion systems."

"A lidar sensor has a wide field of view and delivers a very detailed image. Google and Nokia's HERE unit both use lidar to map roads, but that type of lidar is too bulky and expensive for production cars."

G. An Autonomous Vehicle Test System that May be Used in Combination with the Present Invention An article entitled The Future of Autonomous Systems, published in Inside Unmanned Systems, describes an Autonomous Vehicle Test System:

"THE AVTS consists of four key elements-the Test Vehicle Drop-In Actuator Kit (DAK), target robots, AVTS software and a positioning system provided by Locata."

"Using robotics for testing is more efficient because the IIHS staff will be able to know, without a doubt, that each test is performed in the exactly the same way, every time . . . ."

"The main goal is to enable us to carry out repeatable and precise tests of the crash avoidance technology that's in the cars we drive . . . ."

"The AVTS was developed based on requirements from the Institute for Highway Safety."

"The DAK, one of two robotic platforms that make up the AVTS, can be installed in any car in 30 minutes or less . . . . The kit attaches to the steering wheel, brake and throttle and allows the test driver to sit in the passenger seat as the robot steers the car."

"The DAK ties into a box that can be stored in the trunk, back seat or passenger seat, he said. That box houses the electronics that provide the data from various sensors, including speed sensors, the Locata positioning system as well as a heading sensor that lets testers know where the vehicle is so it can navigate according to a pre-defined path or a sequence of maneuvers."

"The second robot is basically a dummy car . . . or balloon car that test vehicles can crash into without sustaining damage. This target robot is a mobile platform that carries a soft, crashable target and presents itself to the test vehicle as another automobile."

"This dummy car can support collisions of up to 55 mph and if the test car and target robot collide, the test vehicle simply bumps into the soft target and drives over the robotic platform."

"Perrone Robotics first began developing the software used in the AVTS in 2001, Perrone said, with the goal of creating a general purpose software platform for mobile robotics. They put that software to the test in 2005 when they entered the DARPA Grand Challenge, which tasked teams with building a self-driving ground vehicle able to travel across the Mojave Desert."

"Perrone continued to hone its software, entering a second DARPA challenge in 2007. This time they had to develop a self-driving vehicle that could navigate an urban setting and do everything a human would do including avoiding other vehicles and stopping at intersections."

"The AVTS software is an extension of those projects . . . and contains the same DNA and the same capabilities to perform just about any maneuver necessary with high precision. The software defines and controls the tests, as well as transfers and reviews data.

Each target robot and DAK includes an embedded computer that runs the software for autonomous self-navigation and bot-to-bot communication for precise coordination of relative positioning and logging data."

"To successfully test current and future collision avoidance technology, IIHS needs to be able to achieve very accurate measurements of each vehicles' position on the test track, as well as the vehicles' positions relative to one another. Instead of relying on GPS for positioning, which can be obstructed by trees and impacted by other factors like jammers . . . [IIHS used] Locata, an independent, ground based positioning system that offers precise, reliable, local positioning."

"[In the] first public demonstration of the system . . . the Locata installation achieved 4 cm precision accuracy during the demonstration . . . in both the vehicle under test and the collision target robot."

"Even though the AVTS isn't quite finished, IIHS has already begun using the Locata system and the target robot to test and rate front crash prevention systems. These systems give warnings when a car is about to crash, and automatically apply the brake if the driver doesn't respond fast enough."

"Self-driving cars are equipped with sophisticated safety systems that consist of sensors, radars, cameras and on-board computers, which makes them capable of avoiding obstacles and collisions with other vehicles, pedestrians or cyclists . . . ."

"With autonomous cars, risky driving behaviors, such as speeding, running red lights, driving under the influence, or aggressive driving, could well become a thing of the past. These systems also can reduce traffic congestion, cut carbon emissions, improve traffic flow and even improve air quality . . . ."

H. Traffic Collision Avoidance Systems that May be Used in Combination with the Present Invention Wikipedia reports that Traffic Collision Avoidance Systems (TCAS) are already in use in civilian aircraft:

"A traffic collision avoidance system or traffic alert and collision avoidance system . . . is an aircraft collision avoidance system designed to reduce the incidence of mid-air collisions between aircraft. It monitors the airspace around an aircraft for other aircraft equipped with a corresponding active transponder, independent of air traffic control, and warns pilots of the presence of other transponder-equipped aircraft which may present a threat of mid-air collision (MAC). It is a type of airborne collision avoidance system mandated by the International Civil Aviation Organization to be fitted to all aircraft with a maximum take-off mass (MTOM) of over 5,700 kg (12,600 lb) or authorized to carry more than 19 passengers. CFR 14, Ch I, part 135 requires that TCAS I is installed for aircraft with 10-30 passengers and TCAS II for aircraft with more than 30 passengers."

"ACAS/TCAS is based on secondary surveillance radar (SSR) transponder signals, but operates independently of ground-based equipment to provide advice to the pilot on potential conflicting aircraft."

"In modern glass cockpit aircraft, the TCAS display may be integrated in the Navigation Display (ND) or Electronic Horizontal Situation Indicator (EHSI); in older glass cockpit aircraft and those with mechanical instrumentation, such an integrated TCAS display may replace the mechanical Vertical Speed Indicator (which indicates the rate with which the aircraft is descending or climbing)."

SCOPE OF THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Navigation System for GPS Denied Environments have been disclosed above are intended to educate the reader about preferred embodiments of the invention, and are not intended to constrain the limits of the invention or the scope of Claims.

LIST OF REFERENCE CHARACTERS

ET Enemy troops
HZ Hostile zone
LS Landing site
MB Military base
MR Mountain range
S Satellite
10 Navigation System in a GPS Denied Environment
12 Vehicle
14 Portion of ground
16 Flight path
18 Generalized sensor system reference frame: three dimensions
20 Target
22 Universal reference frame
24 Vehicle reference frame in three dimensions
26 Target reference frame in three dimensions
27 Generalized sensor system reference frame: two dimensions
28 Vehicle reference frame in two dimensions
30 Target reference frame in two dimensions
32 Schematic diagram of a generalize vehicle
34 Location Processor
36 Heading Sensor
38 Absolute Location Sensor
40 Timer
42 Range Doppler Processor
44 Navigation Reference Sensor
46 Area Range and Velocity Sensor
48 Narrow Linewidth Emitter
50 Waveform Generator
52 Transmitter
54 Local Oscillator
56 Transmit/Receive Boresight
58 Receiver
60 Static Beam Director
62 Beams from Static Beam Director
64 Narrow Linewidth Emitter
66 Waveform Generator
68 Transmitter
70 Local Oscillator
72 Transmit/Receive Boresight
74 Receiver
76 Dynamic Beam Director
78 Beams from Dynamic Beam Director
79 Flow chart for Range Doppler Processor
82 Demodulate receiver output
84 Determine spectral content 86 Discriminate signal frequencies from noise
88 Obtain velocity from signal frequency
90 Obtain distance from signal frequency
92 Convert range and velocity frequencies to engineering units
94 Send data to Location Processor
96 Flow chart for Location Processor
98 Obtain range and velocity of universal reference frame
100 Obtain attitude and heading of universal reference frame relative to sensor frame
102 Apply translation/rotation transformation of sensor case frame to vehicle frame (center of gravity)
104 Apply translation/rotation transformation of vehicle frame relative to universal reference frame
106 Obtain range and velocity of target in vehicle reference frame
108 Obtain attitude and heading of a target relative to vehicle reference frame
110 Apply translation/rotation transformation of sensor case frame to vehicle frame (center of gravity)
112 Apply translation/rotation transformation of target relative to universal reference frame
114 Pilot/navigator displays
116 Surface relative velocity: Vx
118 Surface relative velocity: Vy
119 Surface relative velocity: Vz
120 Surface relative altitude
122 Flight path angle
124 Velocity
126 Angle of attack
128 Surface relative pitch angle
130 Navigation attributes
132 Side-slip angle
134 Surface relative roll angle
136 Coherent LIDAR Method
138 Narrow linewidth emitter
140 Waveform generator produces modulated emitter output
142 Modulated emitter output divided into two paths
144 Transmitter waveform is amplified
146 Local oscillator waveform is relayed to receiver
148 Waveform transmitted to target and return beam is received by the beam director
150 Received signals are mixed with local oscillator
152 Signals are processed to obtain distance and velocity
154 Data provided to location processor
156 Algorithm to determine current location
158 Obtain current position from internal or external sources
160 Start clock and movement of vehicle
162 Determine heading
164 NRS measures vehicle velocity
166 ARVS measures range and relative speed of objects
168 Calculate new position of vehicle
170 Calculate new position of other objects
172 Send data to GN&C computer

What is claimed is:

1. An apparatus for providing navigation information in a GPS-denied and a high traffic environment comprising:
a vehicle (12); said vehicle (12) having a vehicle reference frame (24);
said vehicle (12) having a location measured with respect to a universal reference frame (22);
a target (20); said target (20) having a target reference frame (26);
a Narrow Linewidth Emitter (48);
a Static Beam Director (60);
said First Narrow Linewidth Emitter (48) being used as a source for emitting a signal
(62) through said Static Beam Director (60) at said universal reference frame (22);
a Second Narrow Linewidth Emitter (64);
a Dynamic Beam Director (76);
said Second Narrow Linewidth Emitter (64) for emitting a signal (78) through said Dynamic Beam Director (76) toward said target (20) to avoid moving near said target (20);
a Heading Sensor (36); said Heading Sensor (36) for determining the direction of said vehicle (12) with respect to said universal reference frame (22);
an Absolute Location Sensor (38); said Absolute Location Sensor (38) providing an initial location fix for ensuing guidance and navigation calculations;
a Timer (40); said Timer (40) for measuring elapsed time between two time intervals;
a Navigation Reference Sensor (44) for measuring the range and velocity of said vehicle (12) relative to said universal reference frame (22); said Navigation Reference Sensor (44) having a sensor reference frame (25);
an Area Range and Velocity Sensor (46); said Area Range and Velocity Sensor (36) for measuring the range and velocity of said vehicle (12) relative to said target (20); said Area Range and Velocity Sensor (46) having a sensor reference frame (25);
a Range Doppler Processor (42); said Range Doppler Processor (42) for determining ranges and velocities from measurements provided by said Navigation Reference Sensor (44) and said Area Range and Velocity Sensor (46); said Range Doppler Processor (42) being connected to said Navigation Reference Sensor (44);
a Location Processor (34); said Heading Sensor (36), said Absolute Location Sensor (38), said Timer (40), said Range Doppler Processor (42) each being carried onboard said vehicle (12) and each being connected to said Location Processor (34);
said Location Processor (34) and said Range Doppler Processor (42) for providing the range and velocity of said vehicle (12) relative to said universal reference frame (22);
said Location Processor (34) and said Range Doppler Processor (42) for providing the range and velocity of said vehicle (12) relative to said target reference frame (26);
said Location Processor (34) and said Range Doppler Processor (42) for providing the range and velocity of said target reference frame (26) to said universal reference frame (22);
said Location Processor (34) and said Range Doppler Processor (42) for combining heading, range, velocity and timing and previous location data from said Heading Sensor (36) and said Absolute Location Sensor (38);
said Location Processor (34) and said Range Doppler Processor (42) for providing current locations of said vehicle (12) and said target (20); and
a Compass (36); said Compass (36) for providing a fully self-contained navigation system;
a Navigation Reference Sensor Waveform Generator (50);
said First Narrow Linewidth Emitter (48) being connected to said Navigation Reference Sensor Waveform Generator (50);
a Navigation Reference Sensor Transmitter (52);
a Navigation Reference Sensor Local Oscillator (54);

said Navigation Reference Sensor Waveform Generator (50) also being coupled to said Navigation Reference Sensor Transmitter (52) and to said Navigation Reference Sensor Local Oscillator (54);

a First Transmit/Receive Boresight (56);

a Receiver (58);

said Navigation Reference Sensor Transmitter (52) being connected to said First Transmit/Receive Boresight (56) and to said Receiver (58);

said Navigation Reference Sensor Local Oscillator (54) also being connected to said Receiver (58);

said Static Beam Director (60) also being connected to said First Transmit/Receive Boresight (56);

said Static Beam Director (60) emitting and collecting a plurality of LIDAR beams (62);

an Area Range & Velocity Sensor Waveform Generator (66);

said Second Narrow Linewidth Emitter (64) being connected to said Area Range & Velocity Sensor Waveform Generator (66);

an Area Range & Velocity Sensor Transmitter (68);

an Area Range & Velocity Sensor Local Oscillator (70);

said Area Range & Velocity Sensor Waveform Generator (66) also being coupled to said Area Range & Velocity Sensor Transmitter (68) and to said Area Range & Velocity Sensor Local Oscillator (70);

a Second Transmit/Receive Boresight (72);

a Second Receiver (74);

said Area Range & Velocity Sensor Local Oscillator 70 also being connected to said Second Receiver (74);

a Dynamic Beam Director (76);

said Dynamic Beam Director (76) emitting and collecting variable direction LIDAR beams (78).

2. An apparatus as recited in claim 1, in which said Range Doppler Processor (42) in configured to demodulate the output of said Receiver (82);

determine spectral content (84);

discriminate signal frequencies from noise (86);

obtain velocity from a signal frequency Doppler Shift (88);

obtain distance from signal frequency side bands (90);

convert range and velocity frequencies to engineering units (92); and send data to said Location Processor (34).

3. An apparatus as recited in claim 1, in which said Location Processor (34) is configured to obtain range and velocity of universal reference frame in sensor reference frame (98);

obtain attitude and heading of universal reference frame relative to sensor frame (100);

apply translation/rotation transformation of sensor case frame to vehicle frame (102);

apply translation/rotation transformation of vehicle frame relative to universal reference frame (104);

obtain range and velocity of target in sensor reference frame (106);

obtain attitude and heading of a target relative to sensor frame (108);

apply translation/rotation transformation of sensor case frame to vehicle frame (110); and apply translation/rotation transformation of target relative to universal reference frame (112).

\* \* \* \* \*